Aug. 11, 1964 H. W. ROEBER ETAL 3,144,373

APPLYING EMISSIVE LEAVES TO CATHODE SLEEVES

Filed May 18, 1961 16 Sheets-Sheet 1

INVENTORS
Henry W. Roeber &
Leonard D. Schwender
BY
Michael Hertz
ATTORNEY

INVENTORS
Henry W. Roeber &
Leonard D. Schwender
BY
Michael Hertz
ATTORNEY

Aug. 11, 1964 H. W. ROEBER ETAL 3,144,373

APPLYING EMISSIVE LEAVES TO CATHODE SLEEVES

Filed May 18, 1961 16 Sheets-Sheet 3

INVENTORS
Henry W. Roeber &
Leonard D. Schwender
BY
Michael Hentz
ATTORNEY

APPLYING EMISSIVE LEAVES TO CATHODE SLEEVES

Filed May 18, 1961 16 Sheets-Sheet 4

INVENTORS
Henry W. Roeber &
Leonard D. Schwender
BY
Michael Hertz
ATTORNEY

INVENTORS
Henry W. Roeber &
Leonard D. Schwender
BY
Michael Hertz
ATTORNEY

APPLYING EMISSIVE LEAVES TO CATHODE SLEEVES

Filed May 18, 1961 16 Sheets-Sheet 6

INVENTORS
Henry W. Roeber &
Leonard D. Schwender
BY
Michael Hertz
ATTORNEY

APPLYING EMISSIVE LEAVES TO CATHODE SLEEVES

INVENTORS
Henry W. Roeber &
Leonard D. Schwender
BY
Michael Hertz
ATTORNEY

Aug. 11, 1964 H. W. ROEBER ETAL 3,144,373

APPLYING EMISSIVE LEAVES TO CATHODE SLEEVES

Filed May 18, 1961 16 Sheets-Sheet 8

INVENTORS
Henry W. Roeber &
Leonard D. Schwender
BY
Michael Hertz
ATTORNEY

APPLYING EMISSIVE LEAVES TO CATHODE SLEEVES

Filed May 18, 1961 16 Sheets-Sheet 10

INVENTORS
Henry W. Roeber &
Leonard D. Schwender
BY
Michael [signature]
ATTORNEY INVENTORS
Henry W. Roeber &
Leonard D. Schwender
BY
Michael Hertz
ATTORNEY

APPLYING EMISSIVE LEAVES TO CATHODE SLEEVES

Filed May 18, 1961 16 Sheets-Sheet 12

INVENTORS
Henry W. Roeber &
Leonard D. Schwendor
BY
Michael Hertz
ATTORNEY

Aug. 11, 1964 H. W. ROEBER ET AL 3,144,373

APPLYING EMISSIVE LEAVES TO CATHODE SLEEVES

Filed May 18, 1961 16 Sheets-Sheet 13

INVENTORS
Henry W. Roeber &
Leonard D. Schwender
BY
Michael Hertz
ATTORNEY

APPLYING EMISSIVE LEAVES TO CATHODE SLEEVES

INVENTORS
Henry W. Roeber &
Leonard D. Schwender
BY
Michael Hertz
ATTORNEY

Aug. 11, 1964 H. W. ROEBER ETAL 3,144,373

APPLYING EMISSIVE LEAVES TO CATHODE SLEEVES

Filed May 18, 1961 16 Sheets-Sheet 15

INVENTORS
Henry W. Roeber &
Leonard D. Schwender
BY Michael Hertz
ATTORNEY

APPLYING EMISSIVE LEAVES TO CATHODE SLEEVES

Filed May 18, 1961 16 Sheets-Sheet 16

INVENTORS
Henry W. Roeber
Leonard D. Schwender
BY
Michael Hertz
ATTORNEY 3,144,373
APPLYING EMISSIVE LEAVES TO CATHODE SLEEVES Henry W. Roeber and Leonard D. Schwender, Emporium, Pa., assignors to Sylvania Electric Products Inc., a corporation of Delaware Filed May 18, 1961, Ser. No. 111,077
13 Claims. (Cl. 156—361)

This invention relates to the handling of electron emissive films and the coating of cathode sleeves with leaves cut from the films.

In general, the invention is an improvement on the machine disclosed in the patent to Henry W. Roeber 2,998,052, granted August 29, 1961, on an application Serial No. 743,355, filed June 20, 1958.

An object of the invention is to provide a machine wherein the application of an emissive leaf to a cathode sleeve is accomplished during continuous rotary motion of parts to enable faster application of the leaves to cathode sleeves and without imparting vibration to the machine.

Another object of the invention is to construct the machine to enable vertical feed of cathode sleeves down through the machine and to provide means whereby the leaf applying mechanism and associated parts occupy but a small portion of floor space.

Other objects of the invention will become apparent after reading the following specification, when taken in conjunction with the accompanying drawings in which.

Figure 1:
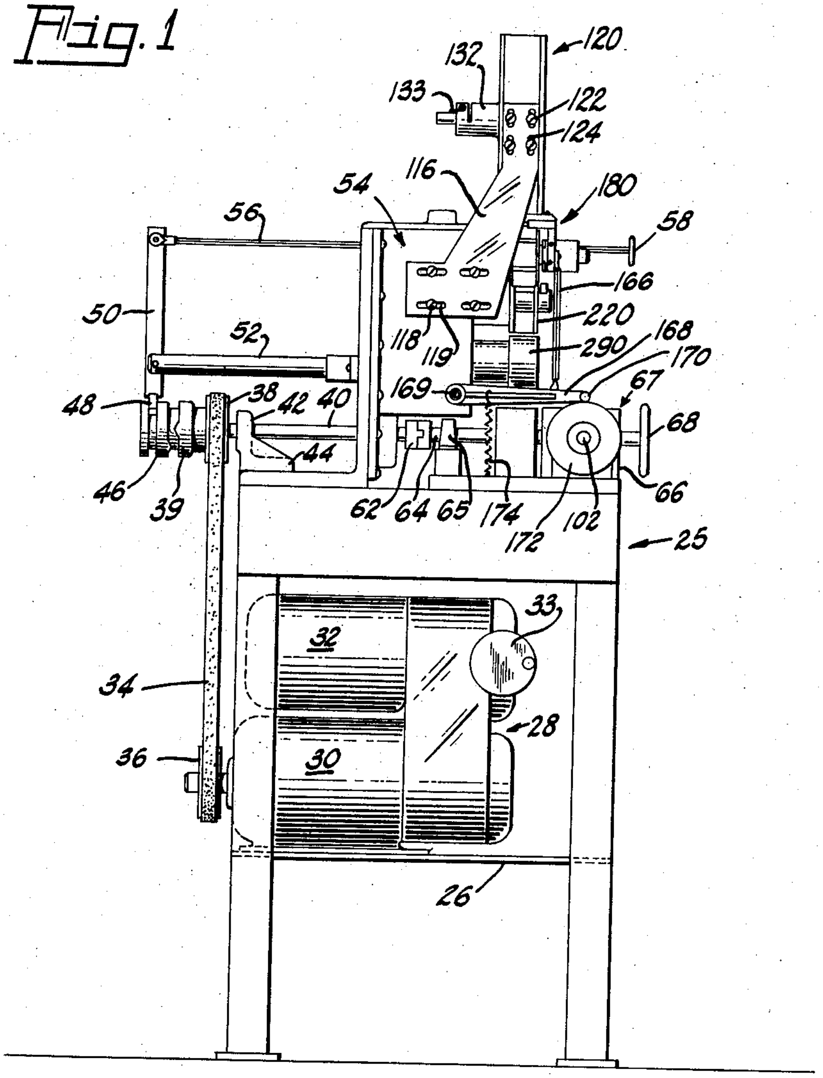
FIG. 1 is an elevational view of the left side of the apparatus, with some parts omitted in the interest of clarity.

Now referring to the drawings with greater particularity, at 25 is indicated a table supporting the emissive leaf applying machine. On a platform 26 beneath the table top is a Reeves transmission 28 comprising a change speed gearing housing 30 and a motor housing 32 mounting a change speed hand crank 33 for the change speed gearing. An internally corrugated belt 34 connects the output pulley 36 of the Reeves transmission with a stub drive shaft pulley 38 on a clutch element 39 rotatable on a stub shaft 40 supported in the vertical wall 32 of an L-shaped casting 44 mounted on the top of table 25. Splined on the shaft 40 is a cooperating clutch element 46 shiftable by a clutch operating yoke 48 on the end of a clutch operating lever 50 pivoted on a support 52 affixed at its right-hand end, see FIG. 1, to a gearbox 54. The clutch lever is operated by a reciprocable rod 56 pivoted to the free end of lever 50 and provided at its operator controlled end with a push-pull knob 58, the rod being suitably guided at its front end in a bracket (not shown) fixed with reference to the table 25.

Figure 2:
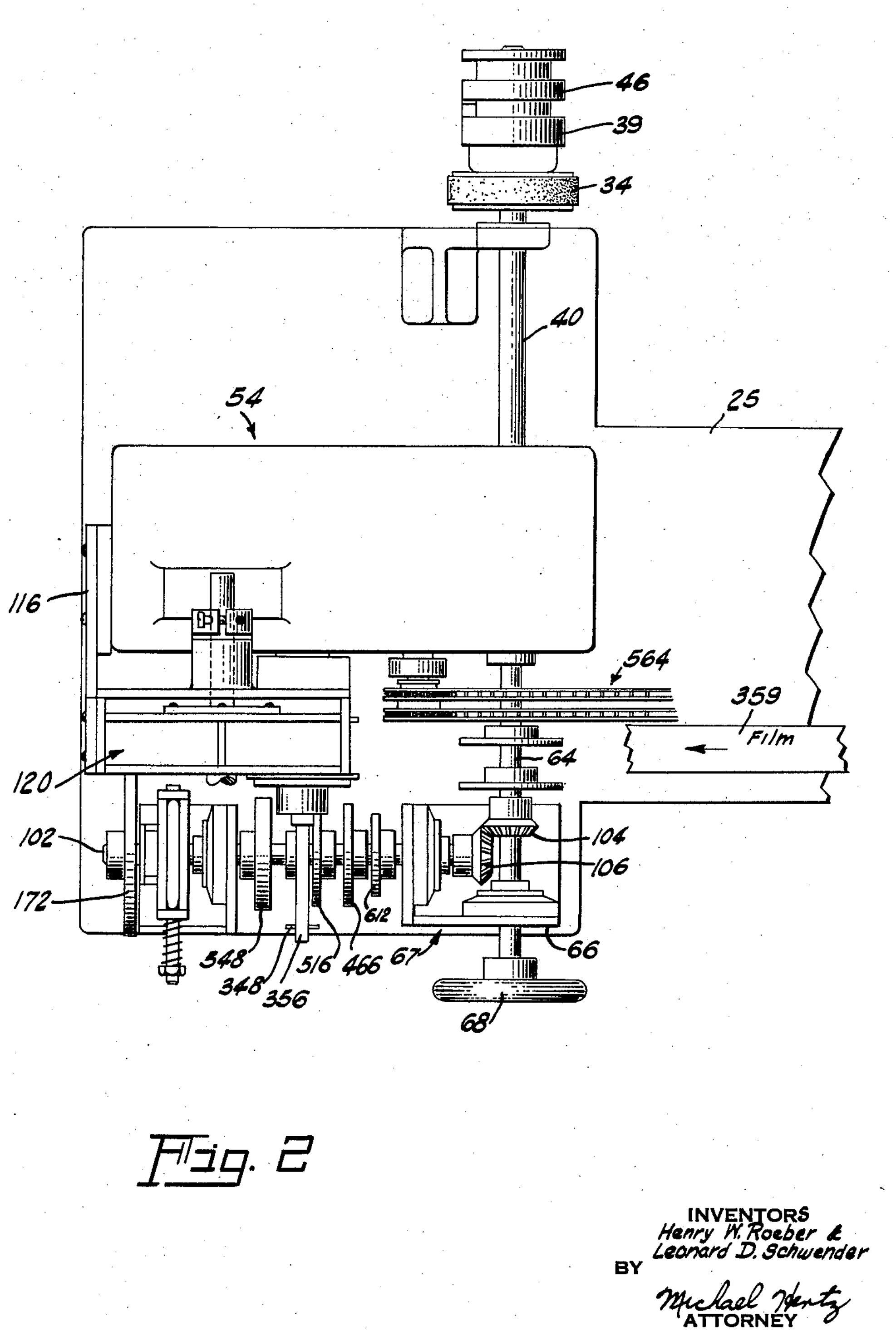
FIG. 2 is a plan view of the apparatus, with some parts omited and other parts broken away in the interest of clarity.
Figure 5:
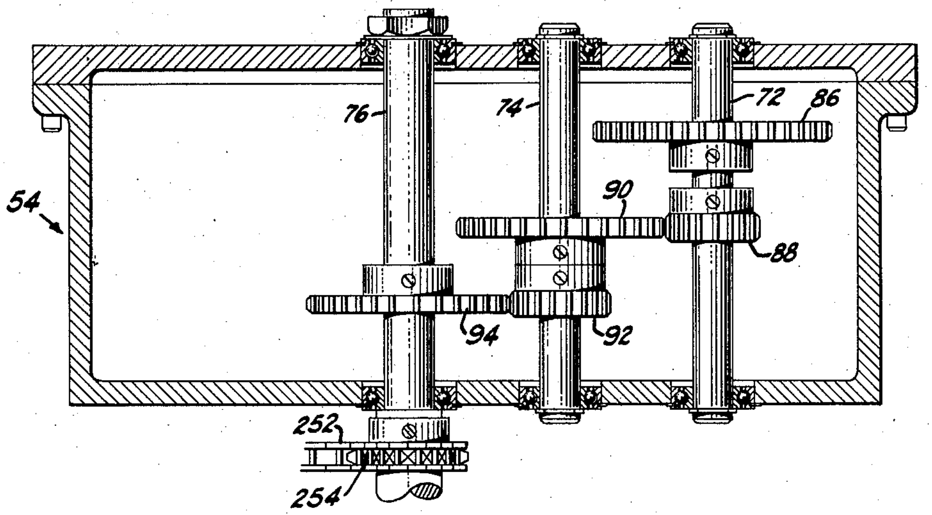
FIG. 5 is a sectional view of the apparatus taken along the line 5—5 of FIG. 3.
Figure 6:
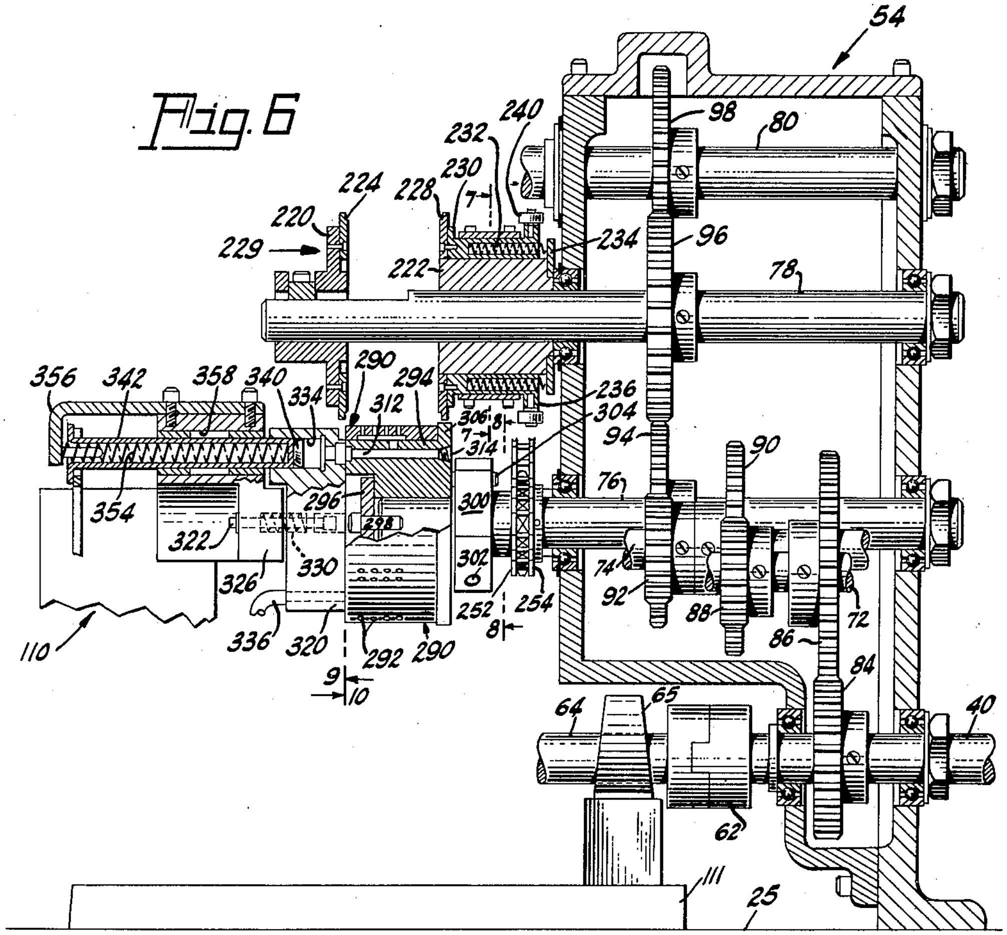
FIG. 6 is a sectional view of the apparatus taken substantially along the line 6—6 of FIG. 3, with some parts omitted in the interest of clarity.

The stub shaft 40 is coupled by a coupling 62, FIG. 6, to the rear end of a cross shaft 64 supported at its rear end in a pillow block 65 and at its forward end in a vertical wall 66, FIGS. 1 and 2, of a front gearbox 67. On the front end of the cross shaft opposite the coupling and outside the gearbox 67 is a hand wheel 68 to operate the machine by hand when the clutch 39, 46 is disengaged. At the rear of the machine mounted on the table 25 is a gearbox 54, FIGS. 2 to 6, enclosing a train of gears on various shafts, as will be described. The shafts are all supported in bearings in the walls of the gearbox 54 and, as seen best in FIG. 6, comprise shafts 40, 72, 74, 76 and 78 driven from shaft 40 in the order named, and also shafts 80 and 82, the shaft 78 being geared directly with and driving both shafts 80 and 82. To accomplish this, the following train of gearing is employed: On the shaft 40 is fixed a gear 84, driving a gear 86 fixed on shaft 72. A second smaller gear 88 fixed on the same shaft 72, see FIG. 5, meshes with a large gear 90 fixed on shaft 74, a small gear 92 fixed on shaft 74 meshing with a large gear 94 on shaft 76. Also meshing with the gear 94 is a gear 96, see FIG. 4, fixed on shaft 78. The gear 96 meshes with gears 98 and 100 fixed respectively to shafts 80 and 82. Some of the shafts described are extended outside of the gearbox 54 toward the front of the machine to mount certain operating devices, as will be described. Before describing these devices, reference will be further made to a longitudinal cam shaft 102, FIG. 3, connected by bevel gears 104 and 106 to the cross shaft 64. The cam shaft is journaled at one end in the bevel gearbox 67 and at the other end in the vertical wall 108 of a right-angled shaft support 110, the lower right-angled portion 112 being fastened to the top of a bed plate 111 in turn fastened to the top of table 25. A gusset 114 reinforces the support.

Figure 11:
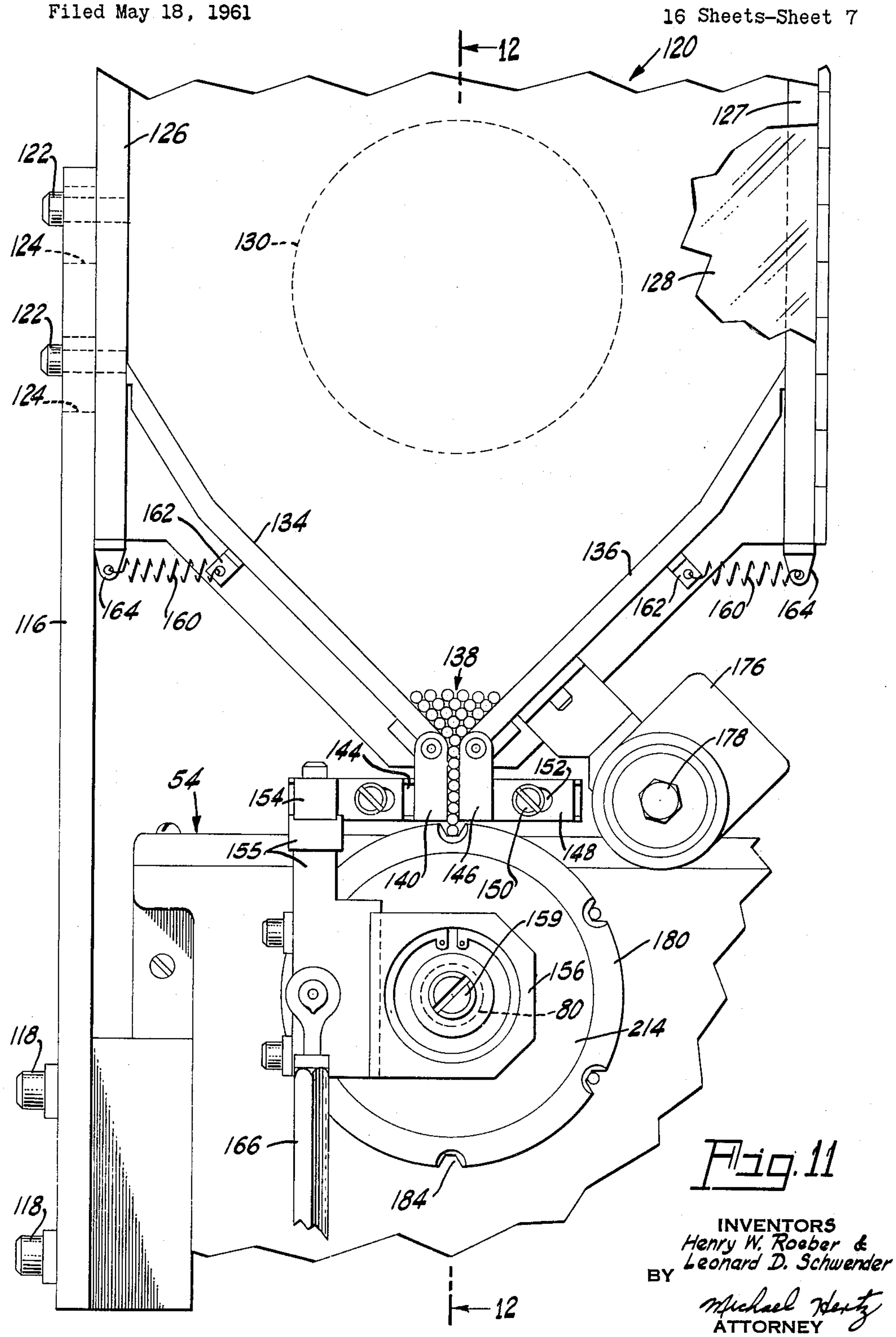
FIG. 11 is a front elevation of the cathode feeding hopper.
Figure 12:
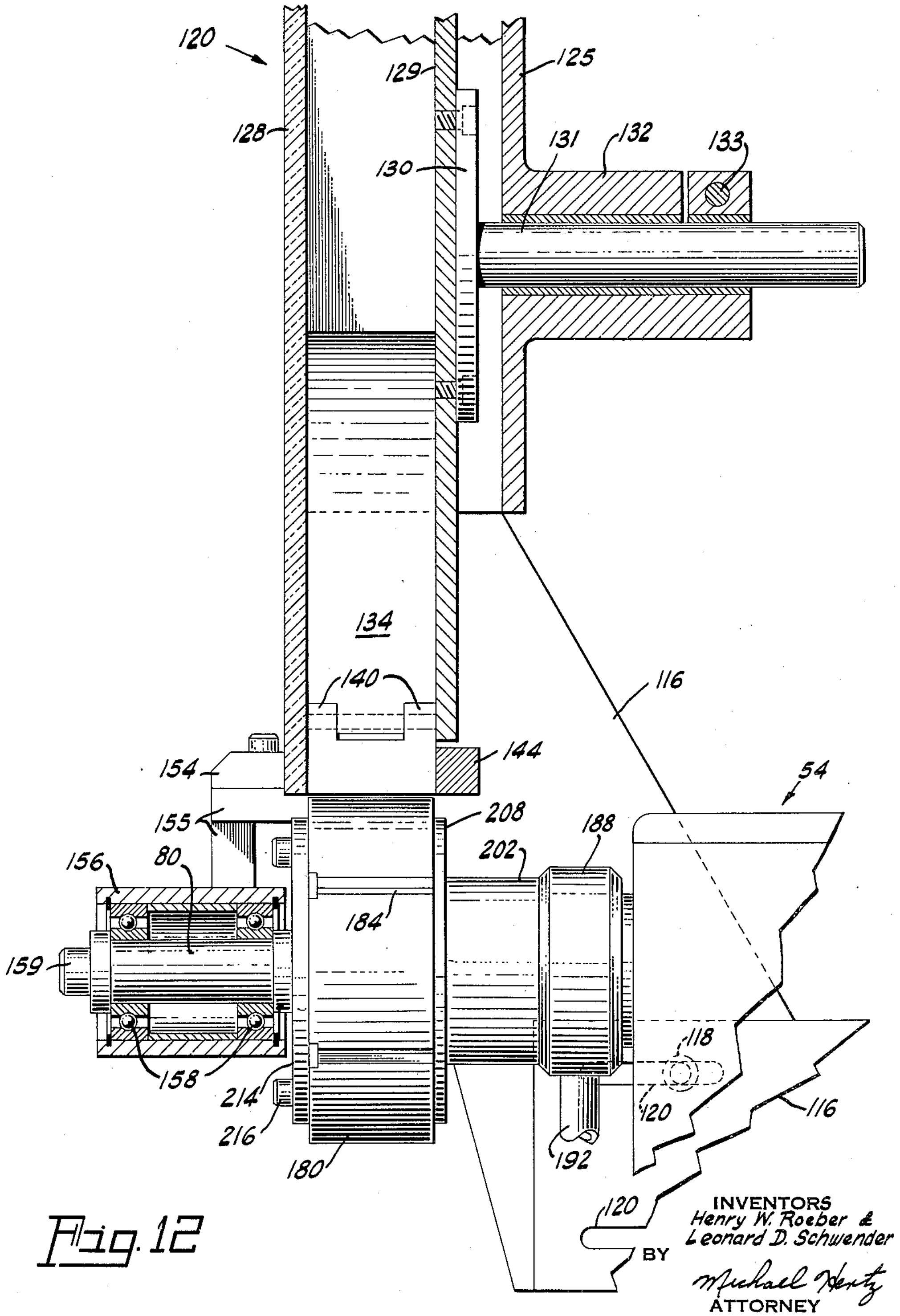
FIG. 12 is a sectional view of the cathode feeding hopper, taken on line 12—12 of FIG. 11.

The mechanism for feeding cathode sleeves to a leaf applying station within the machine will now be described. Mounted on a side wall of the gearbox 54, FIGS. 1 and 11, is a bracket 116. For the purpose of enabling the bracket to be adjusted forwardly and backwardly, the bracket is attached to the gearbox by bolts 118 passing through horizontal slots 119 in the bracket. The bracket at its upper end carries a cathode feeding hopper 120 vertically adjustable on the bracket by means of bolts 122 threaded into a side wall of the hopper and passing through vertical slots 124 in the bracket. The hopper comprises a casing with a back 125, FIG. 12, two sides 126 and 127 and a transparent hinged front wall 128. Within the hopper is a false back consisting of a plate 129 parallel to the back 125 and adjustable toward and from the transparent front wall to accommodate various lengths of cathode sleeves by reason of attachment to a circular flanged portion 130 of a horizontal rod 131 movable in a bearing 132 welded to the back of the hopper and clamped thereto as by a screw 133 drawing split portions of the bearing together.

The bottom of the hopper, FIG. 11, comprises a pair of pivoted and translatable inclined walls 134 and 136, as will be described, with a cathode sleeve feed mouth 138 between the lower ends of the inclined walls. These walls are pivoted at their lower ends in pairs of upstanding ears 140, FIGS. 11 and 12, on a gate support 144, and a second pair of upstanding ears 146 on a block 148 adjustable toward and from the ears 140 on the gate support, as by a bolt 150 threaded into the gate support 144 and passing through a horizontal longitudinal slot 152 in the block 148. The support 144 is integral with and at right angles to a key 154, FIG. 11, adjustably, horizontally, slidably mounted in a keyway in the upper end of a block 156 oscillatable about shaft 80, there being ball bearings 158, FIG. 12, between the block 156 and shaft; a bolt 159 and associated washer hold the block 156 against removal from the shaft, the bolt being tapped into the end of shaft 80.

The inclined walls rest at their upper ends against the side walls 126 and 127 of the hopper and slide therealong as will be described. They may be held against these side walls by springs 160 stretched between ears 162 on the inclined walls and fixed ears 164 on the side walls of the hopper. As the block 155 is oscillated, it will be appreciated, the pairs of ears 140 and 146 will oscillate with the block causing the feed mouth 138 to oscillate about the axis of shaft 80. During this action the inclined walls 134 and 136 will slide down the side walls of the hopper, pivoting on the ears 140 and 146, as necessary.

Figure 3:
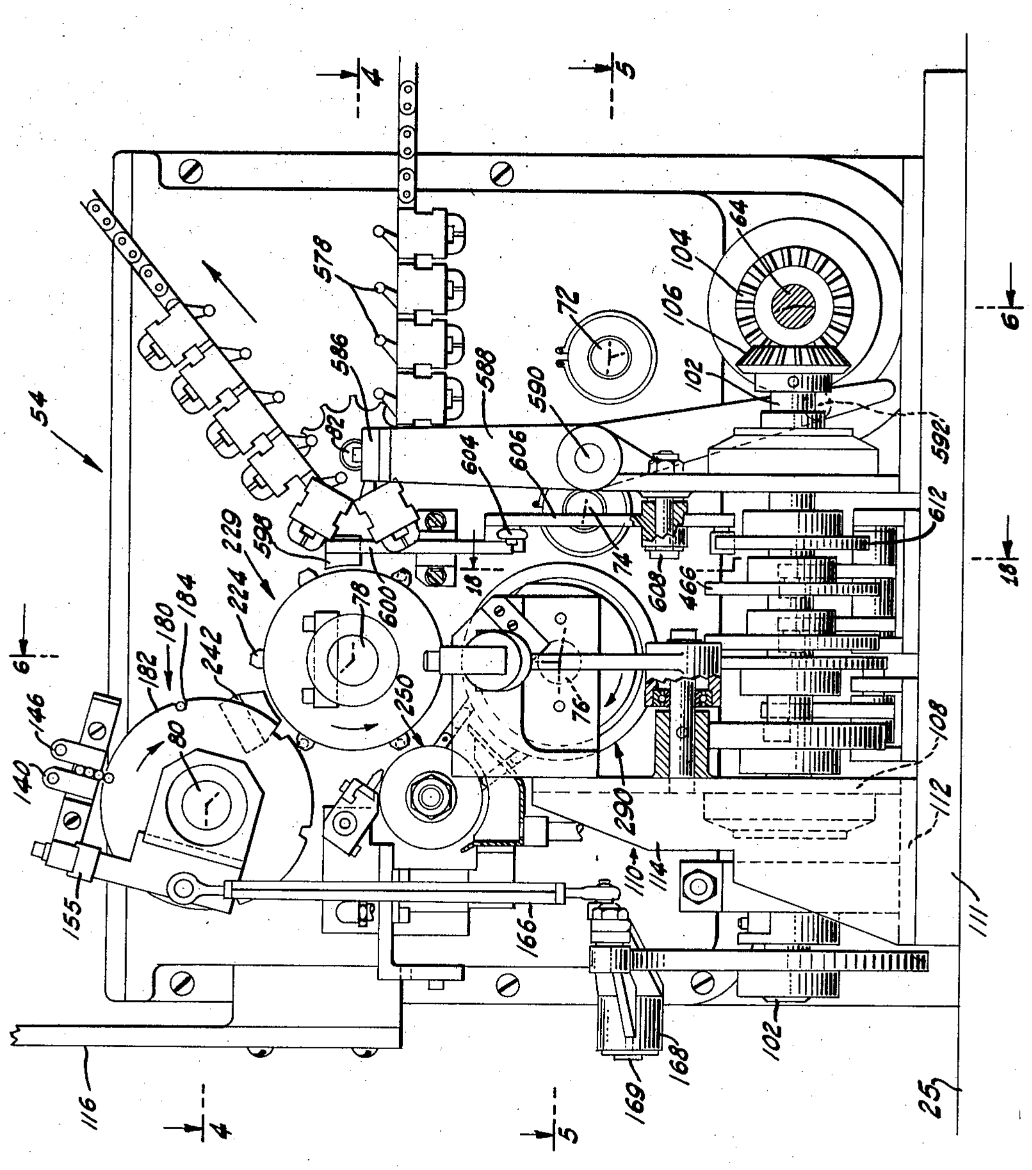
FIG. 3 is an elevational view of the front of the apparatus, with parts broken away and parts omitted in the interest of clarity.

To oscillate the block 155 and associated block 156 about the shaft 80, there is provided a link 166 pivoted at its upper end to the block 155, the lower end being pivoted to an intermediate portion of a lever 168, FIG. 3 and FIG. 1, whose other end is pivoted on a pivot post 169 extending laterally from the gearbox 54 and having at its free end a cam follower 170 bearing against a cam 172 on the left-hand end of shaft 102. A spring 174 stretched between the lever 168 and the top of table 25 maintains the cam follower 170 in engagement with the cam 172. The oscillation of the bottom gate of the hopper is for the purpose of causing the gate to follow receiving slots in a cathode sleeve transfer turret, to be described soon. The oscillation of the bottom also assists in the proper agitation of feeding of cathode sleeves down the inclined bottoms of the hopper. To assist in this agitation, one of the bottom walls, as for example wall 136, has affixed to its undersurface any suitable form of vibrator as a rotating eccentric weight 176 rotated by an air motor about the axis of pin 178, or by an independent electric motor or otherwise.

Figure 4:
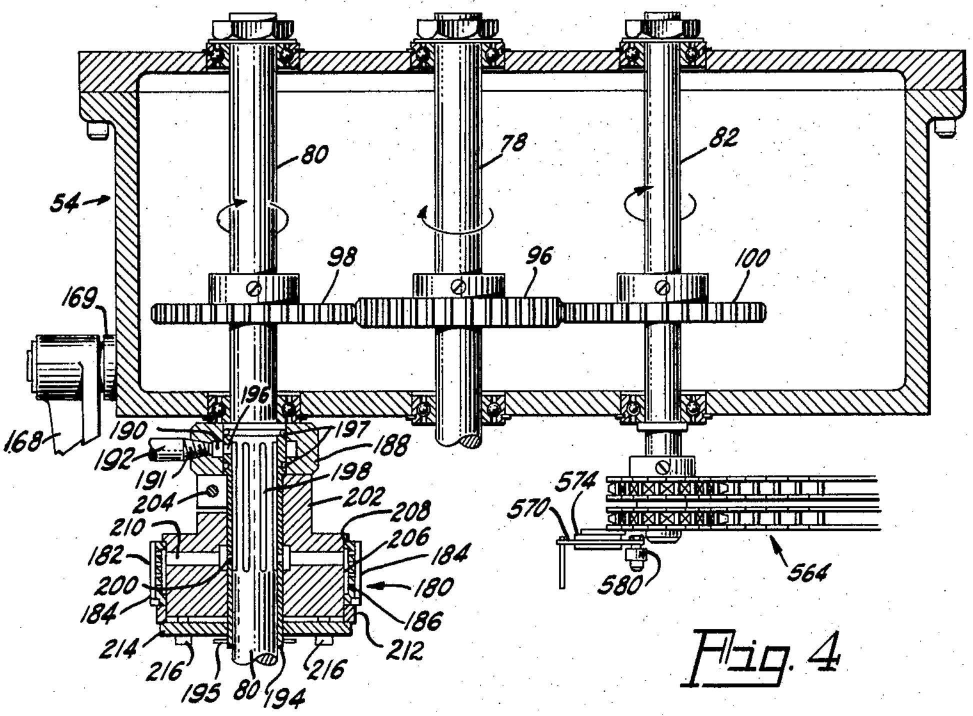
FIG. 4 is a sectional view of the apparatus taken along the line 4—4 of FIG. 3.

The transfer turret 180, FIGS. 3 and 4, is rotatable with the shaft 80. It comprises a cylindrical drum 182, the outer periphery of which is provided with slots 184 parallel to the axis of the drum and perforated with a number of perforations 186 leading from the bottom of the slots to the space within the drum so that when suction is applied to the interior of the drum, a cathode sleeve picked up when a slot is beneath the feed mouth 138 of the hopper will be held to the drum until the cathode sleeve is plucked therefrom. The peripheral speed of the drum is coordinated with the oscillatory movement of the gate support 144 so that the mouth of the gate will register with a slot in the drum for about 15 degrees of rotation of the drum to enable the cathode sleeve fed into the slot to assume a quiescent state therein, seated properly in the slot, see FIGS. 3 and 11. Some cathode sleeves are very small and have very thin walls. To ensure proper feeding of the cathode sleeves to the drum, the gate mouth is very close to the drum and the oscillatory motion of the gate and movement thereof with the drum, after initial deposit of the cathode sleeve in a slot in the drum, assures proper positioning of the sleeve in the drum for subsequent proper pick off from the drum and non-crushing of the sleeve on return movement of the gate mouth.

Surrounding the shaft and abutting the gearbox 54 is a stationary ring 188 with a groove 190 in its interior wall and a suction port 191 connected with a rigid, fixed, suction line 192. Within the ring is a sleeve 194 pinned at its outer end, as at 195, to the shaft 80 and having a number of perforations 196 therethrough registering with the groove in the ring 188 and provided with air sealing packings 197 to prevent suction leakages. The shaft 80 at the end extending beyond the gearbox 54 is grooved, as indicated at 198, to register with the perforations 196, the forward end of these grooves registering with further perforations 200 in the forward end of the sleeve. Secured to the sleeve 194 is a turret hub 202 held to the sleeve as by a screw 204 drawing split portions of the hub together. This hub has an enlarged cylindrical seat 206 provided with a shouldering flange 208 against which is seated an end of the drum 182 previously described. The perforations 186 in the drum communicate with bores 210 in the hub, 202, these bores in turn communicating with the perforations 200 in the sleeve 194. To hold the drum in place there is employed a spacer ring 212 seated on the enlarged hub portion and a clamping washer 214 bearing against the spacer ring and held to the hub by screw 216. Thus, the spacer ring and drum are clamped between the clamping ring and the flanged shoulder 208. This arrangement is provided to permit of substitution of different length drums 182 and rings 212 in the turret assembly 180 to accommodate different length cathode sleeves. The false back 129 of the hopper is adjusted concordantly.

Figure 7:
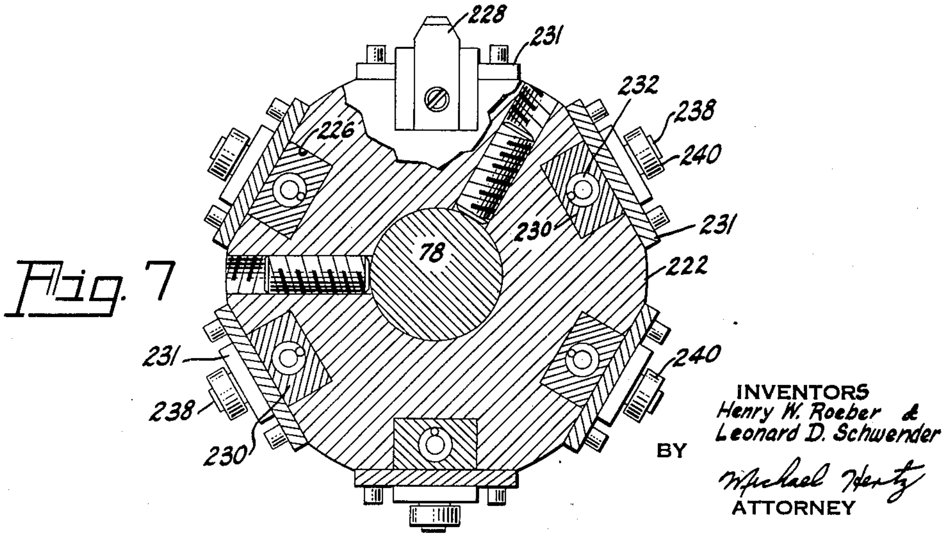
FIG. 7 is a sectional view taken along the line 7—7 of FIG. 6.

Fixedly mounted in a desired position longitudinally of the shaft 78, see FIG. 6, is a non-shiftable jaw mounting plate 220 and cooperating shiftable jaw mounting drum 222. The plate 220 has a hub portion suitably secured to the shaft and carries a series of radially projecting jaws 224, equal in number and spacing to the number and spacing of the slots 184 in drum 182. The drum 222, FIG. 7, has slots 226 corresponding in number and position to the jaws 224 to accommodate sliding jaws 228, the companion jaws 224 and 228 forming a part of a pick-off turret 229 operating to remove cathode sleeves from the slots in the transfer turret, carry the sleeves past a wetting station, past a point where an emissive coating is applied to the sleeve and then to a point opposite a conveyor, where the jaws separate to allow for removal of the coated sleeve by the conveyor. Each of the sliding jaws is fastened to a slide 230 in a slot 226, covered by a cover plate 231 fastened to the drum, each slide having a bore accommodating a spring 232, the rear end of the spring abutting a plate 234, FIG. 6, fastened to the rear of drum 222. Each slide has an upstanding boss 236 accommodating a pin 238 on the outer end of which is a cam follower roller 240. Mounted on the exterior portion of the gearbox near the bite of the transfer and pick-off turrets 180 and 229, see FIG. 3, is an overhanging arcuate cam plate 242 operative when a cam follower roller 240 is moving therealong to move the jaw 228 away from the companion jaw 224 to enable it, upon release from cam action and under influence of its spring 232, to engage the end of a cathode sleeve in a slot 184 and drive it against the companion fixed jaw, whereby the two jaws 224 and 228 remove the cathode sleeve from the slot 184, against the action of suction on the sleeve.

The jaws 224 and 228 then carry the cathode sleeves past a solvent sprayed drum 250, FIG. 3, which may be coated with an absorbent sponge-like material. When the cathode sleeve is opposite the drum, it becomes coated with the solvent.

Figure 13:
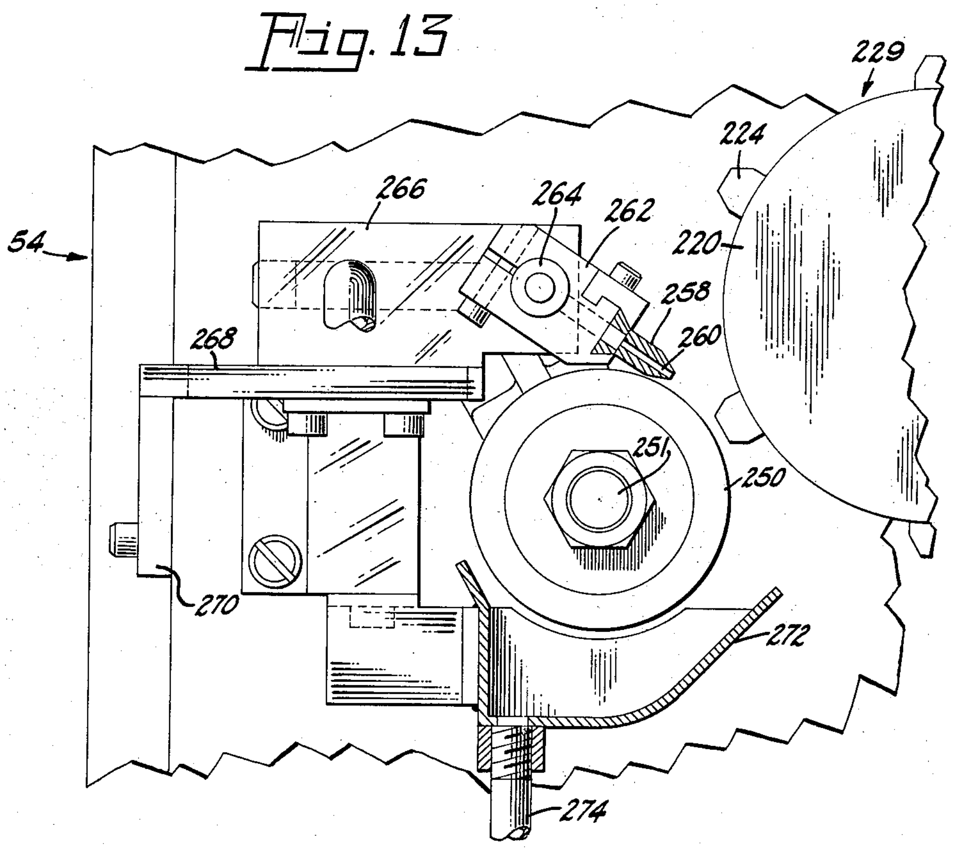
FIG. 13 is a view of a solvent applying drum and adjacent portions.
Figure 14:
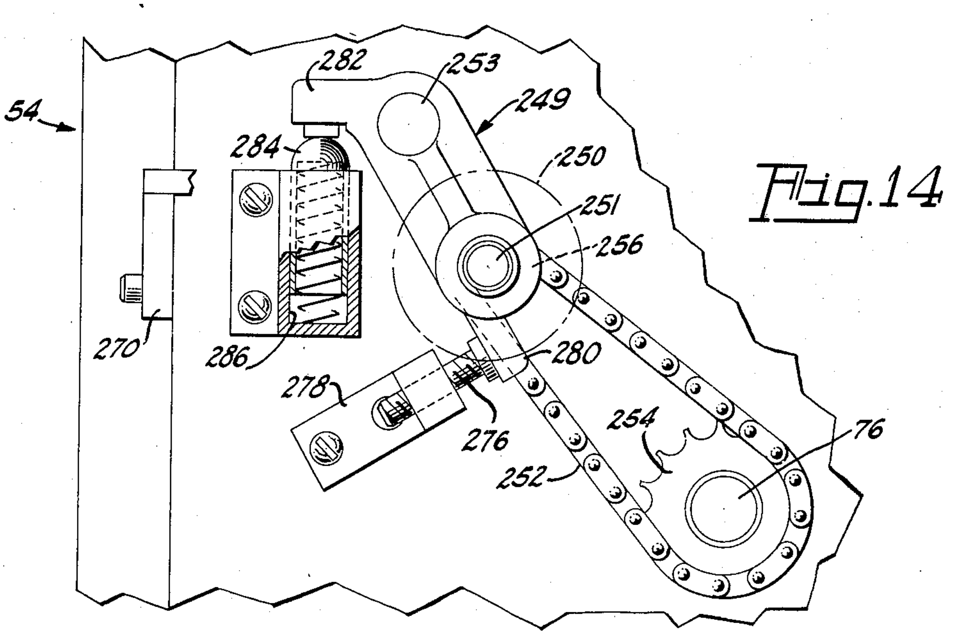
FIG. 14 is a view, with parts omitted, showing supporting and adjusting means for the solvent applying drum.
Figure 18:
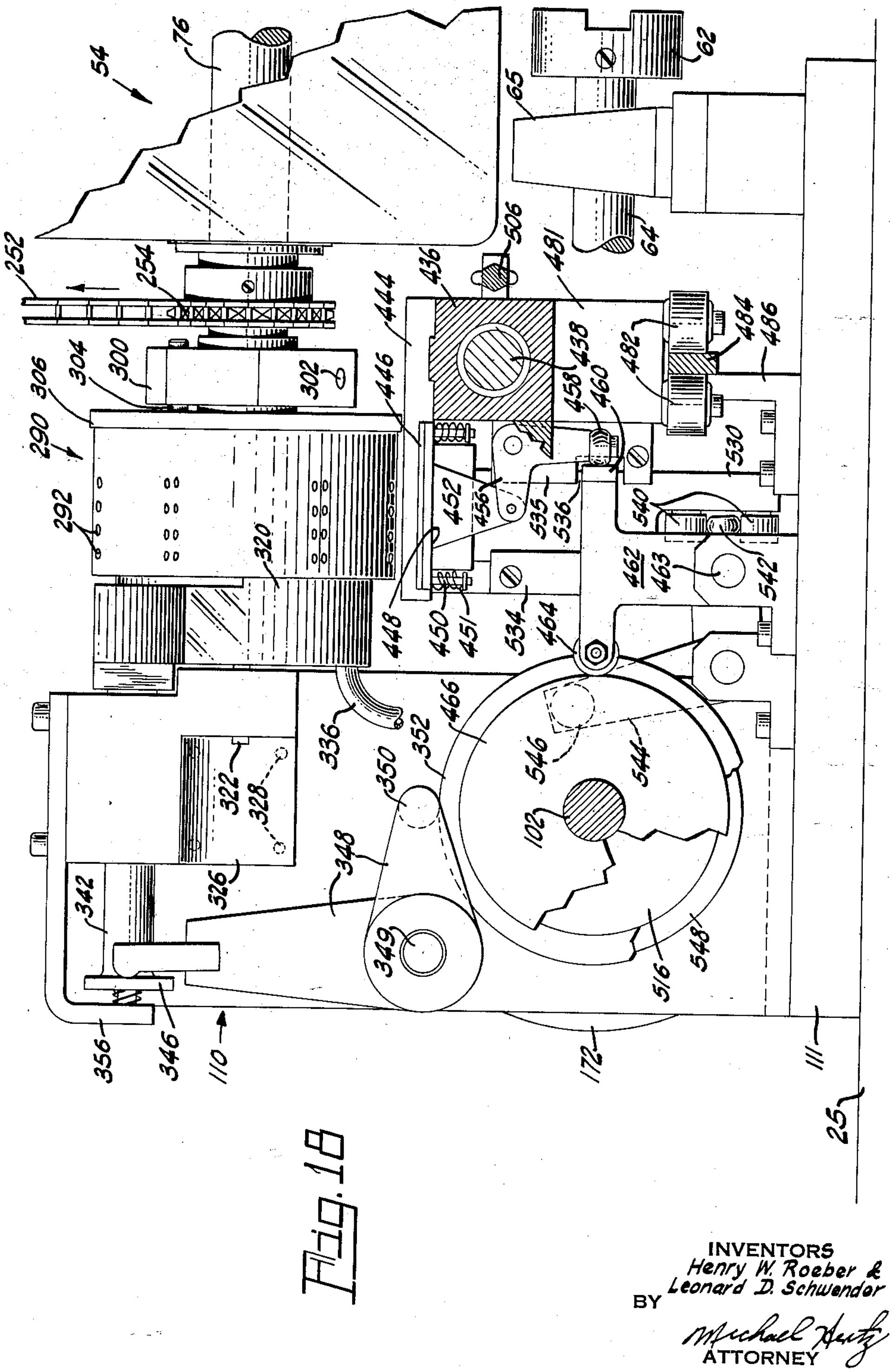
FIG. 18 is a sectional view taken substantially along the line 18—18 of FIG. 3.
Figure 19:
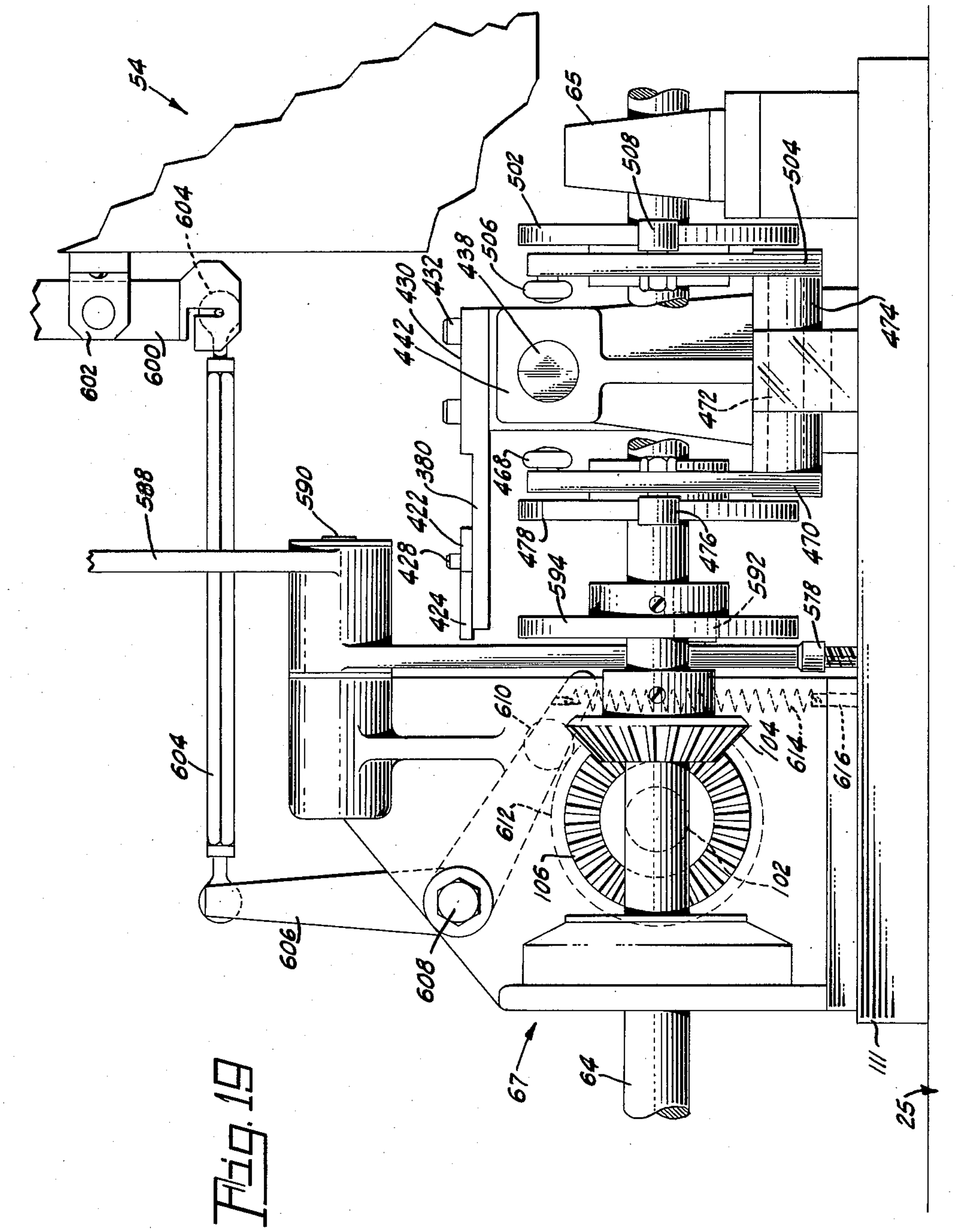
FIG. 19 is a partial elevational view of the right side of the apparatus.

In order to precisely adjust the position of the drum relative to the cathode sleeves carried by the jaws on turret 222, the drum, see FIGS. 13 and 14, is fixed on a rotatable stub shaft 251 mounted in one end of an angled support 249. The other end of the support 249 is pivotally mounted on a shaft 253 which is supported in the front wall of the gear housing 54. The stub shaft 251 is rotated by a drive chain 252 trained about a sprocket 254 on the drive shaft 76 and a sprocket 256 on the stub shaft. Solvent liquid is directed to flow over the drum by a wide nozzle 258 having a multiplicity of perforations 260 thereacross to uniformly distribute the liquid over the surface of the drum. The nozzle is adjustable toward and from the gearbox and may be fastened in adjusted position on a nozzle carrying block 262 slidably adjustably fastened to a pipe 264. Both the pipe and block are suitably perforated to allow fluid to flow from the pipe, through the block and into the nozzle. The pipe 264 terminates and is fastened in a chamber 266 slidable on a way 268 parallel to the adjacent wall of the gearbox to enable the nozzle to be adjusted as close to the drum as may be desired. The way 268 is mounted by means of an integral bracket 270 on a wall of gearbox 54. The chamber 266 is fed with solvent liquid under pressure. The liquid from the nozzle flows over the drum 250 or sponge thereon and then into a trough 272 mounted on a wall of the gearbox, the trough being drained by a pipe 274 leading to the reservoir from which the solvent liquid is pumped to the chamber 266. The drum 250 may be adjusted toward and from the jaws 224 and 228 by adjustment of a back stop screw 276 threaded in a bracket 278 fastened to the gearbox and acting against an arm 280 on support 249, the arm having an angled portion 282 engaging a spring pressed plunger 284 in a pocket 286 carried by the gear housing. The spring pressed plunger maintains the arm 280 against the stop screw 276 in its adjusted position. The liquid from the nozzle flows copiously over the drum or sponge thereon and the sleeve which is brought opposite the drum is therefore thoroughly wetted with the solvent. The solvent is of the type discussed in the patent to Kerstetter and Wennin 2,986,671, issued May 30, 1961, and in the Roeber patent above referred to. In brief, the liquid is a solvent for the binder in an emissive film comprised of the triple carbonates of barium, calcium and strontium, the binder being in the nature of a cellulose acetate. When the solvent is applied to a sleeve and the sleeve is brought into contact with a leaf comprised of the triple carbonates in the binder, the solvent, by capillary atcion, causes the film to wrap itself about the sleeve. The film leaf to be wrapped around the sleeve is brought beneath the lowermost point in the travel of the jaws 224 and 228 by a leaf transfer drum 290, see FIGS. 6 and 18, mounted on the shaft 76 and provided with suction ports or apertures 292 to carry a leaf from a leaf forming mechanism below the drum to the upper position adjacent the cathode sleeve.

Figure 8:
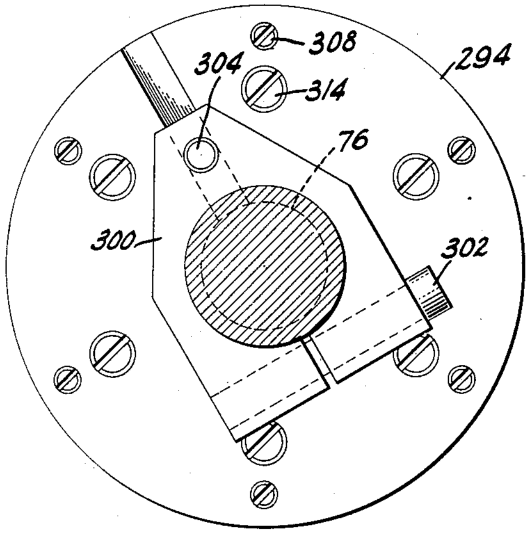
FIG. 8 is a sectional view taken along the line 8—8 of FIG. 6.

The suction ports 292 in the transfer drum are arranged in transverse pairs, spaced apart circumferentially of the drum the distance apart of the sleeves carried by the jaws 224, 228, and will suction-carry a leaf to beneath a sleeve. Upon arriving at the upper position, air will be blown through the ports to waft the leaf into contact with the solvent wetted sleeve, whereupon the leaf, by reason of capillary action of the solvent, will wrap itself about the sleeve, as clearly explained in the disclosures above referred to. The leaf transfer drum is sleeved on a turret 294 on shaft 76 and held against removal from the end of the shaft by a washer 296 in a recess in the turret and a screw 298 passing through the washer and threaded into the end of the shaft. The turret 294, see also FIG. 8, is clamped between the washer and a split clamp 300 fastened to the shaft by a screw 302. A dowel 304 joining the clamp and turret 294 ensures rotation of the turret with the clamp and shaft. By reason of the disclosed structure, it is possibel to interchange drums and turrets for different length leaves. The adjustment of plate 220 on the sleeve carrying turret 229 provides for accommodating different length sleeves to be associated with the leaves.

Figures 9, 10:
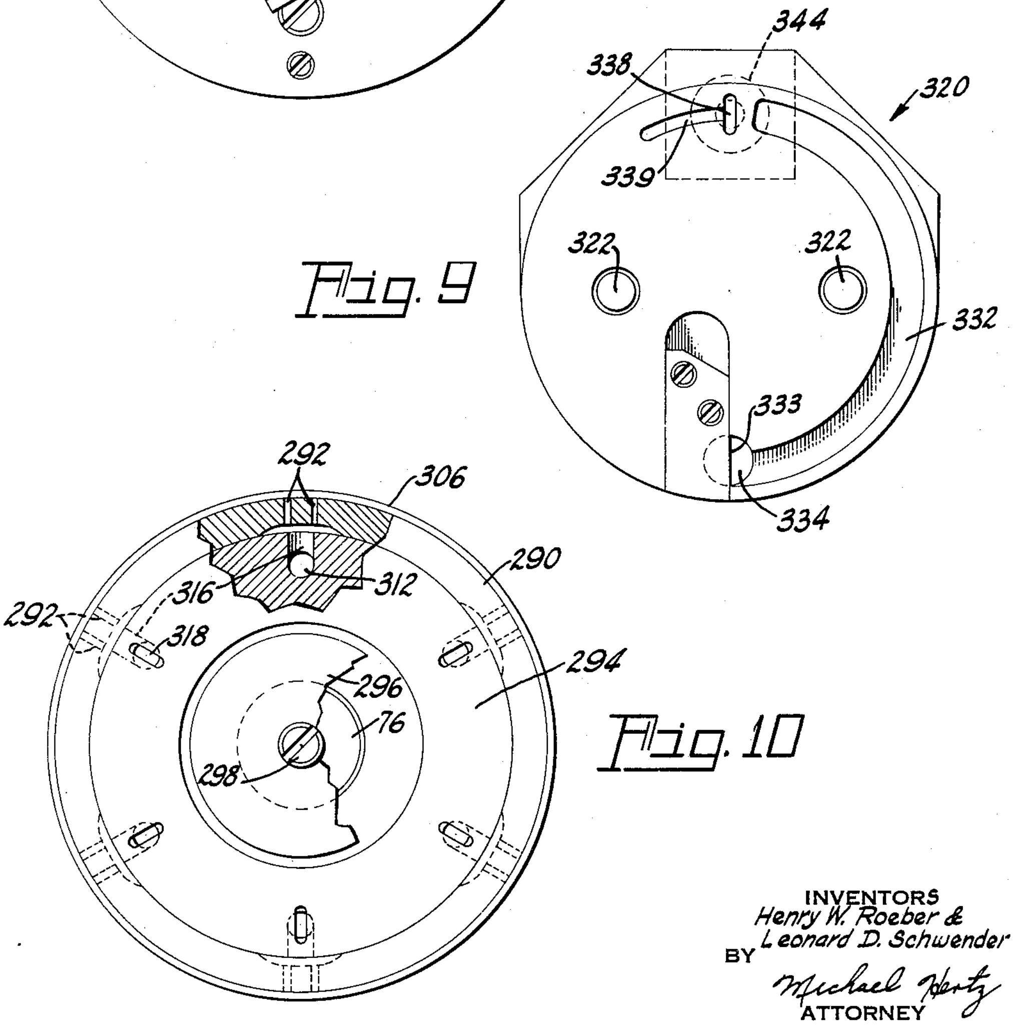
FIG. 9 is a sectional view taken along the line 9—9 of FIG. 6.
FIG. 10 is a sectional view taken along the line 10—10 of FIG. 6.

The leaf transfer drum 290, see FIG. 6, is held on the turret and against a flange 306 on the turret by screws 308 passing through holes in the flange and threaded into the abutting end face of the drum. The turret, see FIG. 10, is provided with transverse bores 312 plugged at their back ends by plugs 314 and having radial passageways 316 communicating with the areas beneath the apertures 292 in the drum 290. The bores 312 in the front face of the turret terminates in ellipsoidal openings 318 for sharp valve cutoff, as will be explained. The front face of the turret forms a valve pad 350, FIGS. 6, 9 and 18, the pad having two guide pins 322 slidable in bores 324 in a bearing block 326 fastened by screws 328 to the upper end of shaft support 110. Springs 330 react between pockets in the bearing block and in the valve pad to maintain the pad against the turret 294. The valve pad has an arcuate groove 332 substantially 180 degrees in extent with a sharp vertical cutoff wall 333 in the form of an insert therein. Suction to this groove is applied via a port 334 at the sharp cutoff area and a flexible suction hose 336. At the upper part of the valve pad is a port 338 through which a puff of air under pressure may be applied, the port having an arcuate extension 339 of small extent leading therefrom to supply air under pressure to the apertures 292 in the drum 290 during its revolution to ensure complete removal of a leaf which may have not been applied to the cathode sleeve at the inception of the air puff. The suction in the groove 332 is for the purpose of continuously maintaining the leaf on the drum from the time it is picked up at the lower level of a series of apertures 292 until it is brought to the upper level adjacent to the cathode sleeve. The means for securing the puff of air is a pump comprising a piston cup 340 on the end of a hollow rod 342 operating in a bore 344 forming a cylinder in the valve pad. The rod 342 has a flange 346 on its forward end for engagement by the forked upper end of a bell crank lever 348 pivoted at 349 on the support 110 and having a cam follower 350 driven by a cam 352 on cam shaft 102. The bell crank lever cocks the pump against the action of a spring 354 in the hollow of rod 342 which reacts between the bottom of rod 342 and the vertical arm of an angled bracket 356 fastened to the upper surface of the bearing block. The cam 352 has a sharp drop therein to allow for the sudden release of the flange from the forked end of the bell crank, the spring 354 then acting to quickly move the piston cup 340 to the right, FIG. 6, to cause the puff of air from the drum perforations. The bearing block has a bushed bore 358 therein to guide the hollow rod.

Thus far there has been described the mechanism for feeding cathode sleeves past a wetting station to the position where leaves of potentially emissive material apply themselves around the cathode sleeves. There will now be described the mechanism for transporting a strip of this material to a cutter beneath the point where leaves cut out from the strip are transported into contact with sleeves carried by the drum 290.

Figure 15:
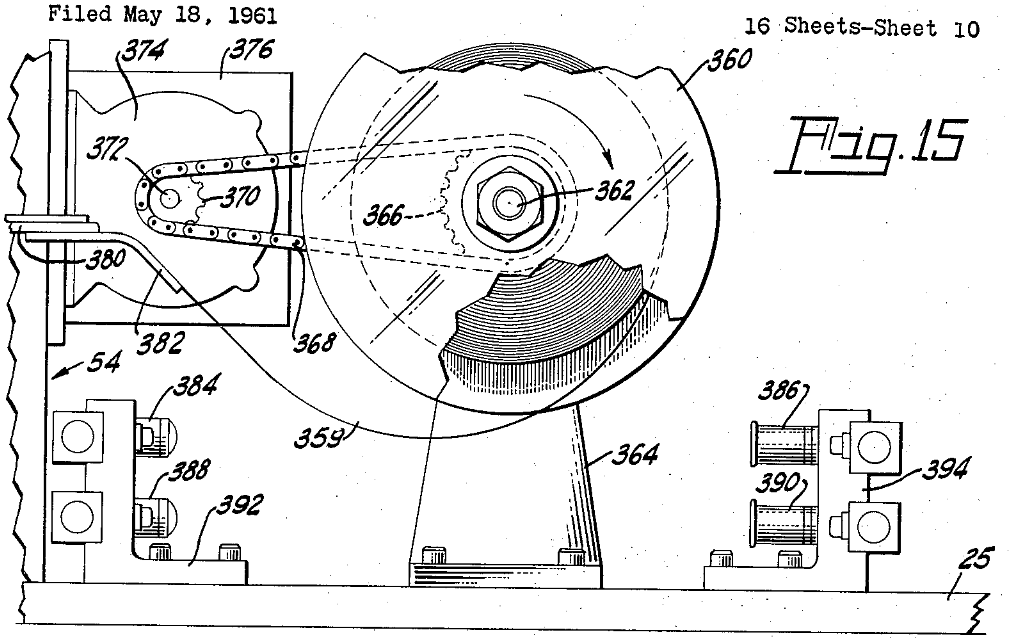
FIG. 15 is an elevational view of an emissive strip feeding means.
Figure 16:
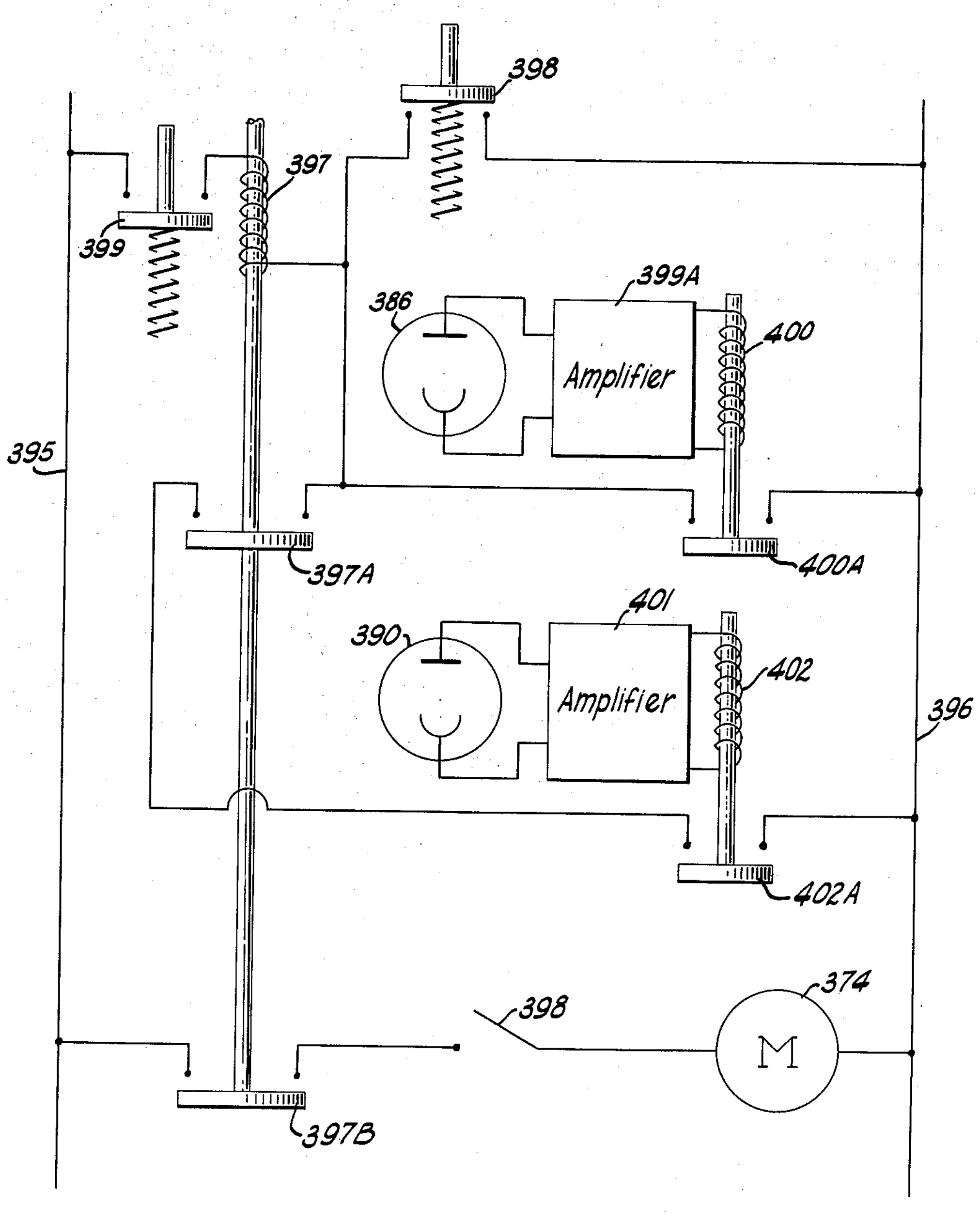
FIG. 16 is a schematic wiring diagram of control means for the emissive strip feeding means.

The emissive strip material 359, FIGS. 2 and 15, is of the width required to be of the proper length axially of the cathode sleeve. It is to be chopped up into leaves of a width just sufficient to wrap itself once about the cathode sleeves. The cathode sleeves may be round or rectangular in cross section or of other cross section. The emissive strip or tape material 359 is in wound condition on a reel 360 frictionally mounted on the front end of a rotatable shaft 362 supported in a standard 364 mounted on the table 25. The rear end of the shaft has affixed thereto a sprocket 366 connected by a chain 368 to a second sprocket 370 on a motor driven shaft 372, the shaft 372 being driven by a motor 374 through reduction gearing in a housing 376. The strip is led in a wide free pendant loop onto a long guide 380, FIGS. 17 and 20, there being an arcuate guide plate 382 at the leading in end of the guide. Since the strip is delicate and should not be subjected to sudden pulls, the feed of the strip material is controlled photoelectrically by the size of the loop between the reel and the arcuate guide 382. For this purpose, two pairs of photoelectric lamps and cells are provided, one pair 384, 386, being at a level above the other, indicated as 388, 390. When the light from upper lamp 384 is not intercepted, so that it reaches photocell 386, the motor is started, and feeds strip material until the lower light beam from lamp 388 is intercepted, whereupon the motor stops. The motor will start again when the upper light beam is again unobstructed by the strip material. The lamps 384 and 388 are mounted on an angled plate 392 fixed to the top of table 25 while the photocells are mounted on a second angled plate 394, also mounted on the top of table 25. The circuitry for operating the motor is illustrated in FIG. 16 and comprises a pair of power lines 395 and 396 between which are placed parallel circuits. One circuit includes a relay coil 397, a normally open start button 398 and a normally closed stop button 399. The relay coil when energized will pull up on a pair of normally open relay contact bars 397A and 397B to close on associated relay contacts. The bar 397B through a single pole double throw manually operated control switch 398 will close the circuit to the motor 374 which will then function to drive the reel 360 to pay out emissive material forming a loop therein between the reel 360 and the guide, if the loop be not already formed. The upper photocell 386, through an amplifier 399A, energizes a relay coil 400, when the light beam is not intercepted by the loop, which relay coil then pulls up on the relay contact bar 400A to establish a shunt circuit around the start button 398, whereby the coil 397 is maintained energized, the contact bar 397B is maintained pulled up and the motor 374 continues to run. The second lower photocell 390, through itst amplifier 401, when the light beam is uninterrupted, will energize relay coil 402 and pull up the associated contact bar 402A to establish a second holding circuit for the coil 397, this holding circuit being closed in part by the bar 397A of relay coil 397.

Assuming a new reel of emissive material to be placed on the shaft 362 and threaded, for example, onto the guide 380 without sufficient loop formation, that is, with the loop obstructing the beam to photocell 386 but not to photocell 390, photocell controlled relay coil 402 will be energized resulting in the bar 402A being pulled up and closing its relay contacts. The contacts of relay 402 will be closed, but since contact bar 397A of main relay 397 is separated from its contacts, the coil 397 is not energized and the motor circuit is open. Depressing of start button 398 will momentarily close the circuit through coil 397 pulling up the bar 397B to set the motor 374 into operation and the reel 360 to unwind emissive material. When the loop becomes large enough to obstruct the light beam to the lower photocell 390, contact bar 402A drops out opening the holding circuit to the coil 397 via its bar 397A, whereby coil 397 de-energizes and the bar 397A drops out to stop the motor. As the material of the emissive strip is drawn into the guide, the loop shortens and eventually moves above the light beam from lamp 388 to its associated photocell 390 allowing the bar 402A to close the relay contacts. But the coil 397 is not energized since the circuit is broken at bar 397A. Thus, as more material is fed into the coating machine, the loop continues to shorten until the light beam to photocell 386 is uncovered, whereby the coil 400 is energized to close the relay contacts via its bar 400A. Since the circuit to coil 397 is direct and not through the holding circuit bar 397A, the coil 397 is energized, the contact bars 397A and 397B are pulled up and the motor 374 is started. As the loop increases in size, the light beam to photocell 386 is obstructed, but since the circuit to coil 397 is still held via the contact bar 397A of coil 397 and contact bar 402A of the lower photocell relay 402, the coil 397 is maintained energized, the motor 374 runs, and the loop continues to increase until the light beam to the lower photocell is obstructed. Thereupon contact bar 402A drops out, the circuit to the relay coil 397 is broken, and the contact bars 397A and 397B drop out.

If the initial loop upon threading of the film into the machine were short of the top light beam, then obviously contact bar 400A would be pulled up and would start the motor 374. If the initial loop were deep enough, then no automatic feed of the material would take place since both relay coils 400 and 402 would be deenergized. Depression of push button 399 will, of course, stop the feed in any case.

Figure 17:
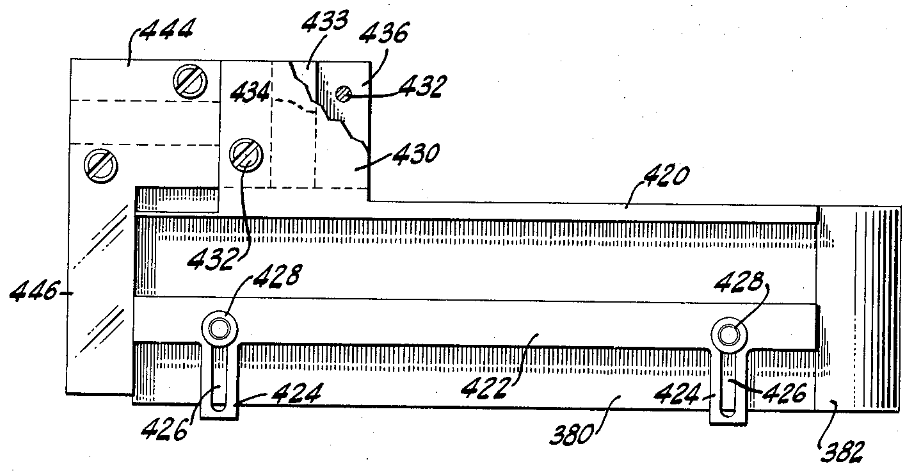
FIG. 17 is a plan view of emissive strip guide means.
Figures 20, 24:
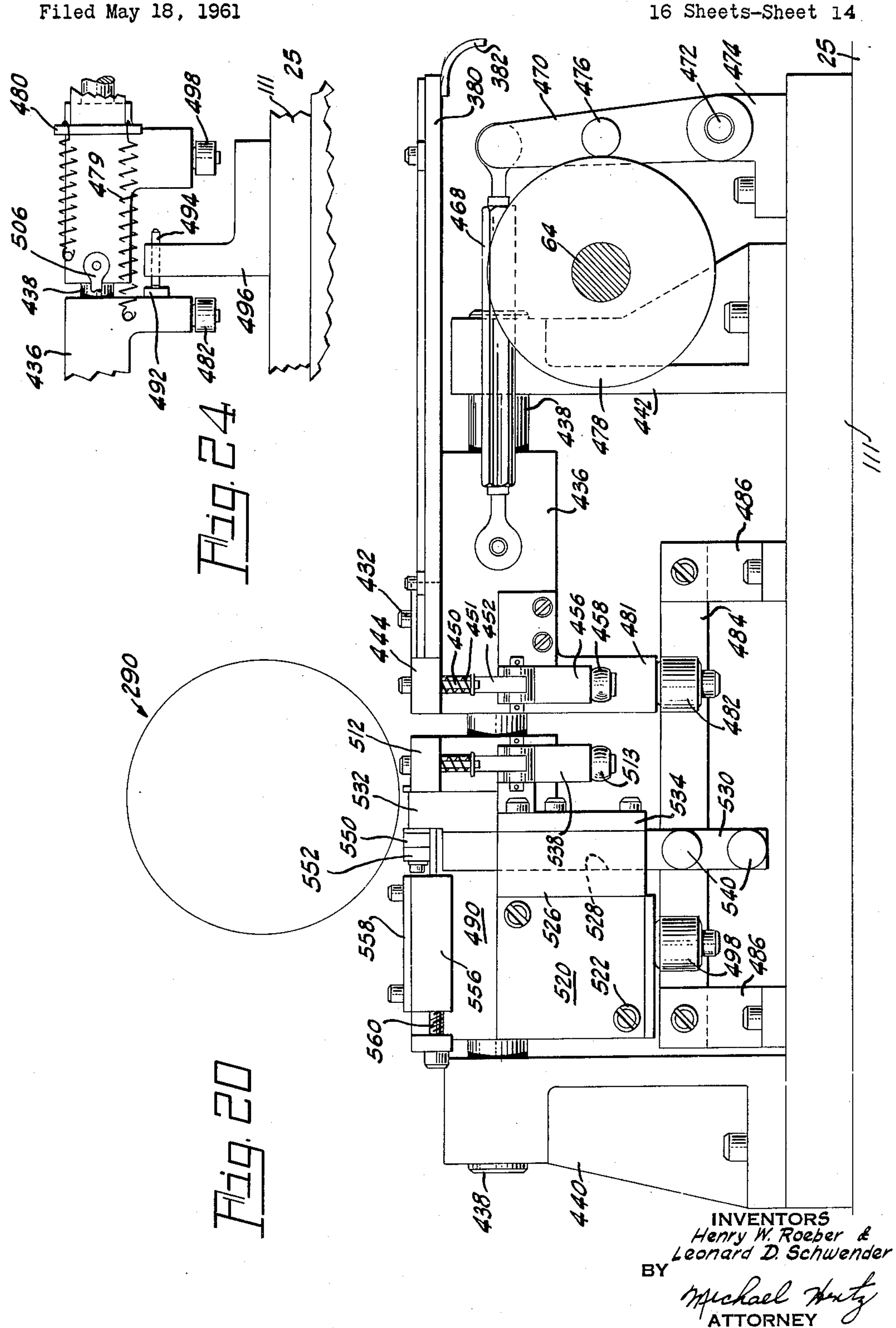
FIG. 20 is a sectional view taken along the line 20—20 of FIG. 19.
FIG. 24 is a fragmentary view of strip feeding mechanism.

As stated heretofore, the strip is fed from off the reel onto the guide 380, FIGS. 17 and 20. The guide comprises a plate having a polished upper surface and a longitudinal flange 420. Mounted on the plate is a laterally adjustable fence 422 having ears 424 with elongated slots 426 therein to enable adjustment of the fence with respect to the flange to leave therebetween an appropriate space for the guidance of the strip. The fence is held to the guide by screws 428 passing through the slots and threaded into the plate. The guide 380, FIGS. 17 to 20, is mounted by an eared portion 430 and screws 432, key portions 433 and slot 434 onto a strip feeding carriage 436 slidable on a rod 438 supported at both ends by standards 440 and 442 secured to the top of bed plate 111. The carriage has also secured to it a plate 444 having a lateral portion forming a clamp jaw 446 slotted on its undersurface to accommodate the strip. Cooperating with this jaw portion is an underlying padded clamp plate 448 sliding on two pins 450 tapped into the upper clamp jaw with springs 451 surrounding the pins to urge the clamp plate toward the jaw. The plate has a depending web 452 with which is loosely pivoted the upper horizontal arm of a crank 456 in turn pivoted on the carriage 436. The vertical arm of the crank is provided at its lower end with a cam follower roller 458 engaging an elongated cam or track surface 460 on the end of the horizontal bar of a T-shaped lever 462 pivoted, as at 463, at the lower end of its vertical leg to a support on the plate 111. The other end of the horizontal bar carries a cam follower roller 464 engageed with a cam 466 on the cam shaft 102.

To move the carriage 436 to the right, FIG. 20, along the rod 438, the carriage has pivotally attached thereto one end of a link 468, the other end of which is pivoted to the upper end of a lever 470 pivoted at its lower end to a pin 472 suitably supported in a bearing 474 affixed to the upper surface of bed plates 111. The lever, intermediate its ends, carries a cam follower roller 476 engaging a cam 478 on the cross shaft 64. To move the carriage to the left, see FIG. 23, a spring 479 is tensioned between a pin on the carriage and a bracket 480 carried on the standard 440. To guide the carriage in its movement and prevent rotation thereof about the rod 438, the carriage has a downward extension as indicated at 481, and at the lower end of the extension is provided with a pair of rollers 482 straddling and hugging the sides of a rail 484 supported at its ends by angle bars 486 affixed to the bed plate 111. The contours of the cams 466 and 478 are such that prior to movement of the carriages and clamp elements 446, 448 to the left, FIGS. 20 and 23, the clamp plate is released to the action of the springs 451 to close the clamp jaws. Then after the carriage has moved the strip forwardly, the clamp plate is pulled downwardly against the action of the springs to allow the strip to be pulled through the clamp elements, as will be explained. The carriage is withdrawn with the clamp plate separated from the upper clamp jaw to prevent retraction of the strip with carriage retreat movement. The feeding movement of the carriage is to thrust the strip close to the far end of a strip cutting instrumentality on a carriage indicated generally as 490. The extent of feeding motion, under influence of the spring 479, is determined by a stop plate 492 on the carriage 436 engageable with an adjustable screw 494 threaded in the upstanding arm of a bracket 496 affixed to the plate 111. If a larger leaf of material is to be formed, the stop screw would be retracted to allow for a larger throw of the link 468.

The cutter carriage 490 also slides on the rod 438 and is guided by the rails 484 by means of rollers 498, in a manner similar to the guiding of strip feeding carriage 436. It is pulled to the left, in FIG. 20, or to the right in FIG. 24, by a spring 500 tensioned between a plate on the carriage 490 and the bracket 480 on the standard 440. The carriage 490 is moved to the right, FIG. 20, by a cam 502 fast on shaft 64 and a lever 504 pivoted on the pin 472. The lever 504 is pivoted at its upper end to a link 506 pivotally connected by a pin to the cutter carriage 490, the lever carrying intermediate its ends a cam follower roller 508 bearing against the cam 502.

Figure 23:
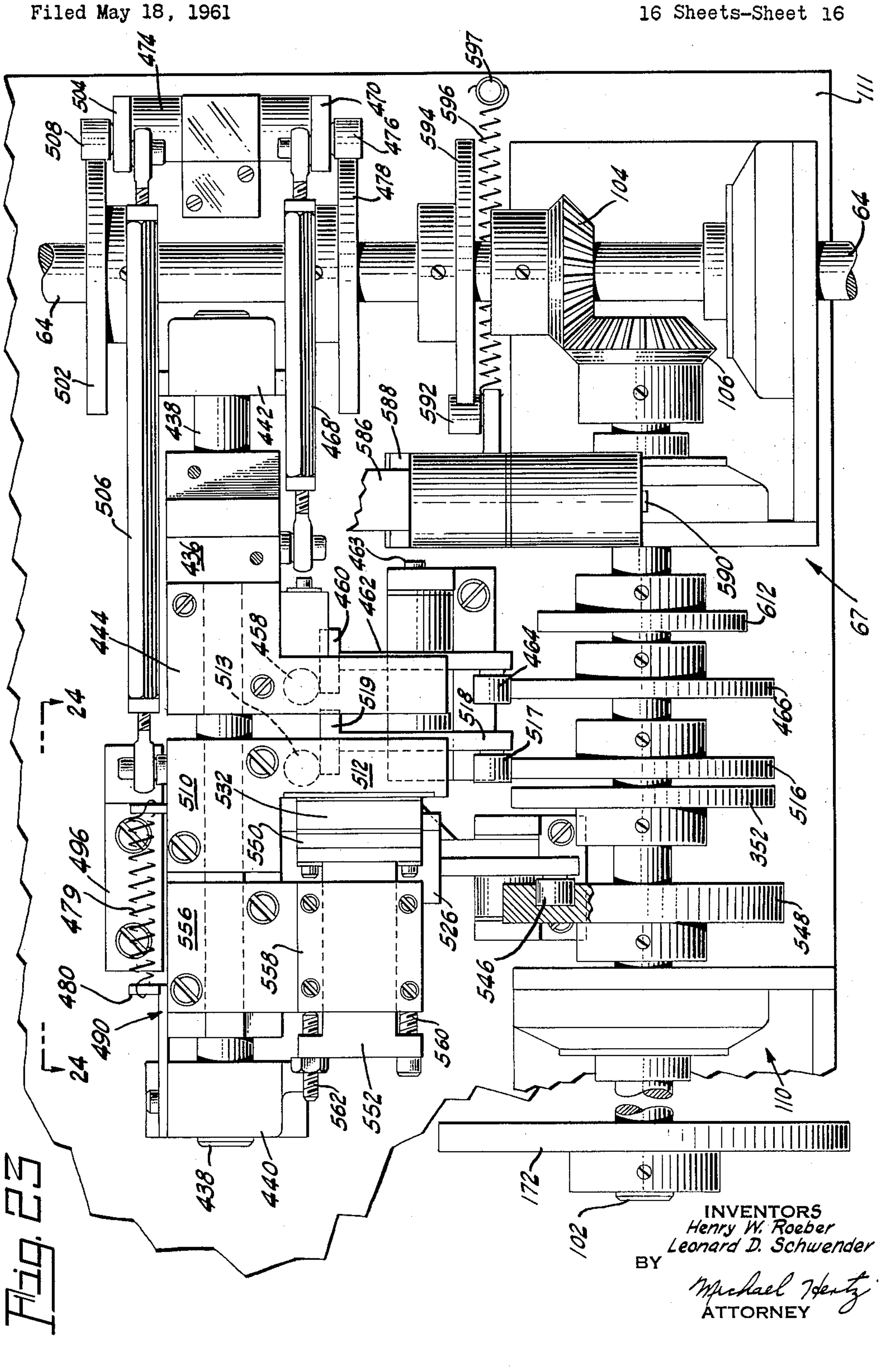
FIG. 23 is a plan view of emissive strip feeding and cutting apparatus.

Atop the cuter carriage, see FIG. 23, is fastened a cover plate 510 with a lateral extension 512 forming a clamping jaw, the undersurface of which is gooved to register with the groove in the clamp jaw 446. Cooperating with this clamp jaw is a padded clamp plate similar to the clamp plate 448 and operated in a similar manner by a lever 518 operating on extension roller 513 riding on the track of the lever 519. This clamp plate is spring pressed toward the jaw 512 and rides on pins in a manner similar to the clamp plate 448 and is operated in a similar manner to release the clamp plate. The release of the cutter carriage clamp plate is effected by a cam 516 operating on a roller 517 on T-shaped lever 518. The contour of cam 516 in relation to cam 466 is such that the clamp plate on the cutter carriage will be permitted to assume clamping position prior to release of the clamping plate on the strip feed carriage, after which the clamp plate on the strip feed carriage is released prior to retractive movement of its carriage for a new bite on the strip. The clamp plate on the cutter carriage is closed on the strip after strip feed by the strip feed carriage and after the cutter carriage has advanced fully toward the strip feed carriage. It is released prior to movement of the cutter carriage away from strip feed carriage to prevent rupture of the strip between the two sets of clamps.

Just after clamping of the strip by the clamping mechanism on the cutter carriage and before movement of said carriage, the cutting off of the strip to form a leaf is accomplished. The cut off strip is then transported to proper position beneath the leaf transfer drum 290.

Figure 21:
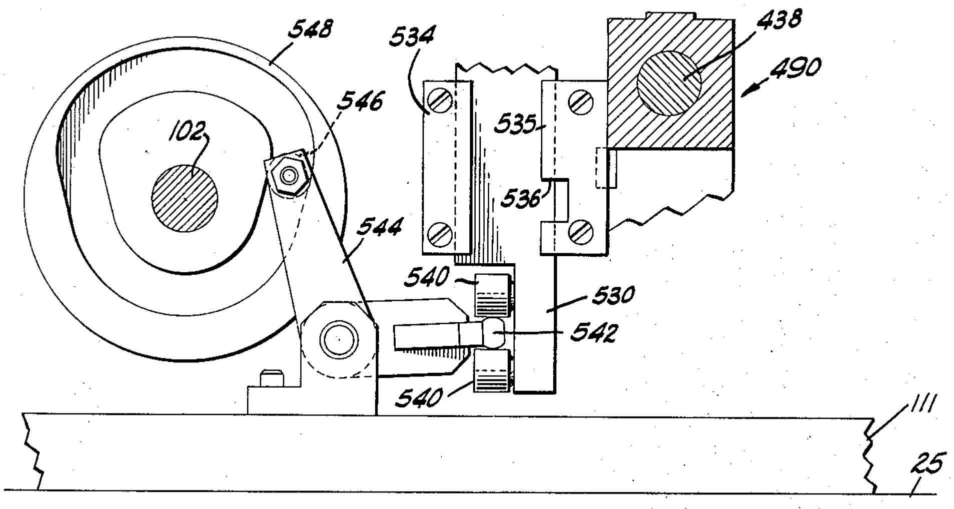
FIG. 21 is an elevational view, partly in section and with parts omitted in the interest of clarity, of a cut-off cam of the apparatus.

The cutter mechanism, FIGS. 20, 21 and 23, comprises a support plate 520 connected to the front side of carriage 490 by bolts 522.

Bolted to and at right angles to the support plate immediately to the left of the cutter carriage clamp jaws is a vertical guide block 526 with a channel therein to accommodate a cutter blade support 530 carrying at its upper end a cutter blade 532 with a hardened edge. Guide plates 534 and 535, FIG. 21, hold and guide the blade support or slide 530 in the channel, guide plate 535 being recessed at 536 to accommodate the adjacent track 519. The plate 535 also provides a pivotal support at its upper end, for the crank 538 of the clamp plate on the cutter carriage.

At the lower end of the slide 530 is a pair of rollers 540 straddling an arcuately movable rail 542 mounted in a substantially horizontal arm of a bell crank lever 544, an upright arm of which carries a follower roller 546 riding in a groove in a cam 548 fixed on shaft 102. The rail 542 enables the tool or cutter carrying slide to be raised and lowered in any position of the cutting carriage as it moves longitudinally of the rod 438 and rail 484. The cam 548 causes the cutter to rise and effect a cutting action on the strip just after the clamping plate on the cutter carriage engages the upper clamping jaw and while the strip feeding carriage moves back to get a new bite on the strip. The cutter blade 532 cooperates with the leftward edge, FIG. 23, of the upper clamping jaw, that edge being case hardened, for cutting the strip.

The leaf, when it is cut off from the strip, is raised by the blade to nearly the upper level of the upper clamping jaw so that when the carriage is moved to the left, FIG. 20, to bring the leaf beneath the leaf transfer drum 290, the suction in the drum can then suck the leaf up against its periphery. To assure proper pick-up of the leaf by the drum 290 and its proper location thereon with reference to the suction ports, it is necessary to adjust the initial position of the cutter carrying carriage with reference to the strip feed carriage. This may be effected by altering the length of the link 506, which for this purpose is made adjustable in length. To protect the cut-off leaf from flying off from the cutter carrying carriage during movement of that carriage from strip cut-off position to leaf pick-up position, the carriage carries an adjustable wall 550 carried by a slide 552 in a slide way of a support 556 bolted to the top of carriage 490. A cover plate 558 holds the slide within the way. The slide may be adjusted to the right, FIG. 23, by threading a screw 560 into the support 556, the head of the screw bearing against the end of the slide, and moved to the left by adjustment of stop screw 562 threaded into the slide and bearing against the support. Of course, when screw 560 is threaded into the support, the screw 562 is backed off, and when screw 562 is moved against the support, the screw 560 is preliminarily backed off. The adjustment of the back wall is to box in the cut-off leaf so that during its travel toward the transfer drum, it will not be displaced with reference to the top surface of the cutter, that surface being flat for the purpose of better carrying the leaf.

Just as the leaf reaches the proper position beneath the perforations in leaf transfer drum 290, and the suction groove 332 comes in communication with the suction line, the leaf is sucked up against the apertures 292. After this operation, the cutter blade sinks and the cutter carriage is moved forward to receive a new piece of the strip material to be cut.

As explained previously, the leaf is carried by the drum substantially to the top of the drum. At this time a wetted cathode sleeve is immediately above the leaf. The puff of air previously described then transfers the leaf into contact with the wetted sleeve, whereby, by capillary action of the solvent on the sleeve between the sleeve and the solvent soluble binder in the leaf, the leaf quickly wraps itself about the sleeve.

The wrapped cathode, carried by the jaws 224, 228 orbited by the shaft 78 is then brought to a position where it can be transferred to a conveyor 564 which carries jaws, the conveyor jaws then bringing the cathode to further processing apparatus as to a solvent drying oven and a welding machine for welding connecting tabs onto the sleeves.

Figure 22:
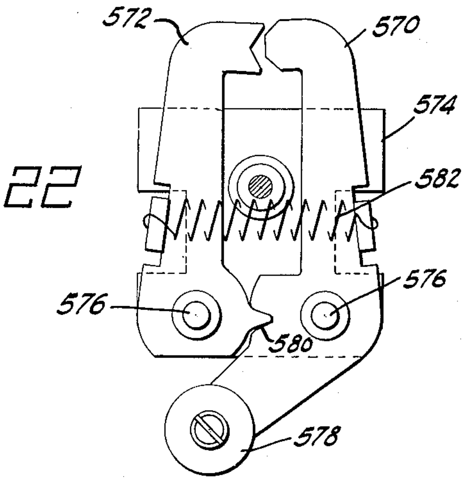
FIG. 22 is a view of conveyor jaws with a front cover plate removed.

The wrapped cathodes are transferred from the jaws 224, 228 to the conveyor jaws substantially at a position level with the shaft 78, see FIG. 3. For this purpose, see FIG. 22, the conveyor chain jaws 570 and 572 are each pivotally mounted in a pair of opposing plates 574 as at 576, jaw 570 carrying an extension with a roller 578 thereon and articulated at 580 with the other jaw 572. A spring 582 stretched between ears on the jaws tends to maintain them in closed position. The roller 578 is engageable with a bar 586, FIGS. 3 and 23, at the upper end of a lever 588 pivoted to an upper extension of one of the walls of the bevel gearbox 67 as indicated at 590, the lower end of the lever carrying a cam follower roller 592 engaging a cam 594 on the drive shaft 64. A spring 596 stretched between the lower end of the lever and a screw 597 extending up from the bed plate 111 maintains the cam follower roller 592 against its cam. As the cathode sleeve reaches the pick-off position, the bar 586 is pivoted to engage the roller 578 to open the conveyor carried jaws. As the conveyor moves along, the open jaws 570, 572 embrace the end of the cathode carried by the jaws 224 and 228. By translatory movement of the jaws and pivoting of the lever 588, the roller 578 is released and under influence of the spring 582 the jaws on the conveyor close on an end of the cathode. Just at this time a cam 598 shiftable toward the gearbox 54 engages a roller 240, FIG. 6, on a shiftable jaw 228 and retracts the jaw against the action of its spring 232. The cam is inclined vertically toward the gearbox so as to open the jaw. To ensure the rapid opening of the jaw 228 at the right time to release the cathode to the jaws on the conveyor, the cam is mounted on the upper end of a lever 600 pivoted on ears 602 extending outward from the gear casing 54, the lower end of the lever being detachably connected to a link 604 pivoted to the upper end of a bell crank lever 606 in turn pivoted on the extension wall of bevel gearbox 67 as at 608, the bell crank lever having a cam follower roller 610 engaging a cam 612 fixed on the cam shaft 102. A spring 614 stretched between the bell crank lever and a pin 616 on the bed plate 111 holds the roller 610 against the cam.

Having thus described the invention what is claimed is:

1. In a machine for applying leaves to cathode sleeves, a leaf feeding mechanism, means for effecting the wrapping of a fed leaf about a cathode sleeve, and means for bringing a cathode sleeve in opposition to the leaf comprising a hopper for containing cathode sleeves, a bottom for the hopper including inclined bottom walls, the lower ends of the inclined walls defining a cathode sleeve dispensing mouth therebetween, a cathode sleeve transfer turret having sleeve receiving slots in its periphery rotatable about a horizontal axis and oscillatory means for shifting the inclined walls with its mouth oscillating about the axis of the turret, whereby cathode sleeves dispensed from the hopper will be fed into the slots during conjoint movement of the inclined walls and turret.

2. In a machine for applying leaves to cathode sleeves, a leaf feeding mechanism, means for effecting the wrapping of a fed leaf about a cathode sleeve, and means for bringing a cathode sleeve in opposition to the leaf comprising a hopper for containing cathode sleeves, a bottom for the hopper including inclined bottom walls, the lower ends of the inclined walls defining a cathode sleeve dispensing mouth therebetween, a cathode sleeve transfer turret having sleeve receiving slots in its periphery rotatable about a horizontal axis and oscillatory means for shifting the inclined walls with its mouth oscillating about the axis of the turret, whereby cathode sleeves dispensed from the hopper will be fed into the slots during conjoint movement of the walls and turret, and a vibrator attached to one of the inclined walls to agitate the cathode sleeves in the hopper.

3. In a machine for applying leaves to cathode sleeves, a leaf feeding mechanism, means for effecting wrapping of a fed leaf about a cathode sleeve and means including a cathode sleeve transfer turret, for bringing a cathode sleeve in opposition to a leaf comprising a hopper for containing cathode sleeves, a bottom for the hopper including a pair of walls inclined downwardly toward each other and defining a sleeve dispensing mouth at the lower ends of the walls, the upper ends of the inclined walls slidably resting against the side walls of the hopper, slots in the transfer turret to receive cathode sleeves therein, and oscillatory means to shift the inclined walls with the mouth oscillating about the axis of the turret whereby cathode sleeves may be fed into the slots in the turret while the mouth and turret are relatively fixed with respect to one another.

4. In a machine for applying leaves to cathode sleeves, a leaf feeding mechanism, means for effecting the wrapping of a fed leaf about a cathode sleeve, and means for bringing a cathode sleeve in opposition to the leaf comprising a hopper for containing cathode sleeves, a bottom for the hopper including inclined bottom walls, the lower ends of the inclined walls defining a cathode sleeve dispensing mouth therebetween, a cathode sleeve transfer turret having sleeve receiving slots in its periphery rotatable about a horizontal axis and oscillatory means for shifting the inclined walls with its mouth oscillating about the axis of the turret, whereby cathode sleeves dispensed from the hopper will be fed into the slots during conjoint movement of the inclined walls and turret, suction ports leading into the slots and means connecting said ports with a supply of air at less than atmospheric pressure.

5. In a machine for applying leaves to cathode sleeves, a leaf applying mechanism, and means for bringing a cathode sleeve opposite to a leaf comprising a hopper for the sleeves having a front wall, side walls, a back adjustable toward and from the front wall and an inclined wall structure leading to a cathode sleeve discharge mouth, a transfer turret for picking up a sleeve discharged from the hopper and transferring it to a second location, said turret including a rotatable shaft, a turret hub fixed on the shaft provided with a shouldering flange, an exchangeable perforated drum having one end seated against said flange, a spacer ring against the other end of said drum and surrounding the hub, a clamping washer fastened to the shaft and bearing against the spacer ring, and means within the drum for connecting a suction fluid to the drum perforations.

6. In a machine for applying leaves to cathode sleeves, a leaf feeding mechanism, and means for bringing a cathode sleeve opposite to a leaf comprising a transfer turret with slots in the periphery thereof adapted to retain cathode sleeves therein, and a pick-off turret to transfer a sleeve from the slots in the transfer turret to a position opposite a leaf, said pick-off turret comprising a shaft, a first fixed, jaw carrying member secured to the shaft, a second, non rotatable member mounted on and adjustable along the shaft, said first member slidably carrying a jaw movable toward and from the adjustable jaw carrying member, means to slide the jaw on the first member to receive a sleeve between the adjustable jaw carrying member and the slidable jaw on the fixed member to pick off a sleeve from the turret in one angular position of the shaft and to release the sleeve from the jaws in another angular position of the shaft, and means intermediate these angular positions of the shaft to apply the fed leaf to the sleeve.

7. In a machine for applying leaves to cathode sleeves, a leaf feeding mechanism, said leaf including a soluble binder, a cathode sleeve carrying turret, said turret including pairs of jaws, each pair being adapted to hold a sleeve therebetween, a drum and liquid supplying nozzle for wetting the sleeve with a solvent for the binder in the leaf, said nozzle being positioned to cause liquid to flow over the drum, means to adjust the drum toward and from the turret and means to operate the leaf feeding mechanism to bring the same into contact with the wetted cathode sleeve, whereby the leaf will wrap itself about the sleeve.

8. In a machine for applying leaves to cathode sleeves, a shaft, a jaw mounted drum fixedly mounted on the shaft, a jaw on the drum, a plate mounting a companion jaw slidably adjustably mounted on the shaft, means for feeding a sleeve to the jaws, a second shaft, a split clamp on the second shaft, a dowel projecting from the clamp, a turret sleeved on the second shaft and coupled with said dowel, a leaf transfer drum provided with suction ports mounted on the turret, a washer bearing against the turret and fastened to the shaft, means for applying suction to the drum and means for feeding a leaf to the drum for suction retention thereby and means for blowing a current of air thru the suction ports, when the leaf is opposite a sleeve, to force the leaf away from the drum and against a sleeve carried by the jaws.

9. In a machine for applying leaves having a soluble binder to cathode sleeves, means to transport a sleeve through the machine from a supply source to a point of leaf application, means for wetting the sleeve while in transit with a solvent for the binder, a motor and a pay out reel drum driven thereby for dispensing a strip of delicate rupturable material to the machine, there being a slack portion in the strip immediately beyond the pay out drum, a photocell control means operative on the motor, said control means sensing the slack in the strip, a chopping mechanism in the machine to cut the strip material into leaves and means to transport the leaves to the point of application thereof to the sleeves.

10. In a machine for applying leaves having a soluble binder to cathode sleeves, means to transport a sleeve through the machine from a supply source to a point of leaf application, means for wetting the sleeve while in transit with a solvent for the binder, a motor and a pay out reel drum driven thereby for dispensing a strip of delicate rupturable material to the machine, a photocell control means operative on the motor, said photocell means comprising a pair of photocells at different vertical levels, and means for casting light beams thereon, the material as it is dispensed from the reel moving in a path to intercept the light beams, means including relays controlled by the photocells and interconnections between the relays and the motor to effect starting and stopping of the motor in accordance with the interruptions of the light beams by the strip, a chopping mechanism in the machine to cut the strip material into leaves and means to transport the leaves to the point of application thereof to the sleeves.

11. In a machine for applying a leaf having a soluble binder to a cathode sleeve, feed means for bringing a cathode sleeve to a location within the machine, means for wetting the sleeve with a solvent for the binder in the leaf en route to said location, means for feeding a strip of material having the soluble binder therein to the machine, a leaf transfer drum within the machine for bringing the leaf opposite the said location, means for effecting contact of said leaf with said wetted sleeve to cause the leaf to wrap itself about the sleeve, cutting means in the machine for cutting said strip into leaves, said strip feeding and cutting means comprising a longitudinally movable carriage carrying a cutter for cutting the strip into leaves and a clamp for holding the strip, means for moving the carriage to a position beneath the leaf transfer drum, suction means in the drum to transfer the leaf from the cutter to the drum, a second longitudinally movable carriage having a clamp therein to engage the strip and move it toward the first carriage, in the open clamp thereof and into association with the cutter, and means to operate the cutter clamps and carriages to effect feeding of the strip into association with the cutter and cutting of the strip into leaves without rupure of the strip.

12. In a machine for applying leaves to cathode sleeves, wherein the leaves comprise electron emissive material in a soluble binder, a suppy of solvent for the binder, means for supporting a strip of said emissive material, a cutter for cutting the strip into leaves, and means for feeding the sleeves downwardly through the machine, feeding the strip laterally to the cutter, feeding the leaves cut from the strip upwardly within the machine until a sleeve and a leaf are opposite each other, said sleeve moving past the solvent supply and being wetted thereby on its motion through the machine, means for transferring a leaf when opposite to the sleeve to wrap itself thereabout, and means to remove the wrapped sleeve from the machine.

13. In a machine for applying, to cathode sleeves, leaves containing electromissive material in a binder.

a gear box, a number of horizonta parallel shafts traversing said box, a hopper above the level of said box for dispensing cathode sleeves, a transfer drum on one of said shafts for receiving said sleeves from said hopper and transferring them to a lower level, a jaw mechanism mounted on another of said shafts, means on the gear box engaging said jaw mechanism to open the same to receive a sleeve from the transfer drum and to close on the same., a source of solvent for the binder in the leaves, a solvent applying drum mounted on a third one of said shafts, and means for transferring solvent from the supply onto the solvent applying drum, the periphery of said solvent applying drum being close to the path traversed by a sleeve carried by the jaw mechanism.

References Cited in the file of this patent

UNITED STATES PATENTS

| | | |
|---|---|---|
| 1,817,831 | Molins et al. | Aug. 4, 1931 |
| 2,492,250 | Wilcox | Dec. 27, 1949 |
| 2,503,799 | Carter | Apr. 11, 1950 |
| 2,818,190 | Boaty | Dec. 31, 1957 |
| 2,998,052 | Roeber | Aug. 29, 1961 |